United States Patent
Zhang et al.

(10) Patent No.: US 9,444,577 B1
(45) Date of Patent: *Sep. 13, 2016

(54) CALIBRATION CORRECTION FOR IMPLICIT BEAMFORMER USING AN EXPLICIT BEAMFORMING TECHNIQUE IN A WIRELESS MIMO COMMUNICATION SYSTEM

(71) Applicant: MARVELL INTERNATIONAL LTD., Hamilton (BM)

(72) Inventors: Hongyuan Zhang, Fremont, CA (US); Rohit U. Nabar, Sunnyvale, CA (US); Sudhir Srinivasa, Campbell, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 61 days.

This patent is subject to a terminal disclaimer.

(21) Appl. No.: 14/190,988

(22) Filed: Feb. 26, 2014

Related U.S. Application Data

(63) Continuation-in-part of application No. 13/077,485, filed on Mar. 31, 2011, now Pat. No. 8,971,178.

(60) Provisional application No. 61/769,412, filed on Feb. 26, 2013, provisional application No. 61/321,046, filed on Apr. 5, 2010.

(51) Int. Cl.
*H04L 12/28* (2006.01)
*H04L 12/56* (2006.01)
(Continued)

(52) U.S. Cl.
CPC .......... *H04L 1/0026* (2013.01); *H04B 7/0413* (2013.01); *H04L 25/03949* (2013.01); *H04L 25/0206* (2013.01)

(58) Field of Classification Search
CPC .......... H04L 1/0026; H04L 25/03949; H04L 25/0206; H04B 7/0413
See application file for complete search history.

(56) References Cited

U.S. PATENT DOCUMENTS 6,584,161 B2  6/2003  Hottinen et al.
7,206,354 B2  4/2007  Wallace et al.
(Continued)

OTHER PUBLICATIONS

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, pp. 1-512 (1999).

(Continued)

*Primary Examiner* — Lonnie Sweet

(57) ABSTRACT

A bi-directionally calibrated beamforming technique for use in a MIMO wireless communication system includes a transmitter communicating a calibration initiation signal to a receiver requesting the receiver send a non-sounding packet containing an estimated description of the forward channel. The receiver also sends a sounding packet to the transmitter. The transmitter determining a partial or full estimated description of a reverse channel based on the received non-sounding packet and/or the receiving sounding packet. The transmitter further determines one or more transmitter correction matrices from receiving estimated description of the forward channel and the partial or full estimated description of the reverse channel. The transmitter sending the partial or full estimated description of the reverse channel to the receiver, which determines one or more receiver correction matrices.

25 Claims, 24 Drawing Sheets

(51) Int. Cl.
*H04L 1/00* (2006.01)
*H04L 25/03* (2006.01)
*H04B 7/04* (2006.01)
*H04L 25/02* (2006.01)

(56) References Cited

U.S. PATENT DOCUMENTS

| | | | |
|---|---|---|---|
| 7,486,740 | B2 | 2/2009 | Inanoglu |
| 7,570,210 | B1 | 8/2009 | Nabar et al. |
| 7,599,332 | B2 | 10/2009 | Zelst et al. |
| 7,729,439 | B2 | 6/2010 | Zhang et al. |
| 7,742,390 | B2 | 6/2010 | Mujtaba |
| 8,270,909 | B2 | 9/2012 | Zhang et al. |
| 8,619,907 | B2 | 12/2013 | Mujtaba et al. |
| 8,971,178 | B1* | 3/2015 | Nabar ............... H04J 3/16 342/368 |
| 2003/0224750 | A1 | 12/2003 | Sampath |
| 2005/0064908 | A1 | 3/2005 | Boariu et al. |
| 2006/0063492 | A1 | 3/2006 | Iacono et al. |
| 2006/0104382 | A1 | 5/2006 | Yang et al. |
| 2006/0176977 | A1 | 8/2006 | Jafarkhani et al. |
| 2007/0127586 | A1 | 6/2007 | Hafeez |
| 2007/0195811 | A1 | 8/2007 | Basson et al. |
| 2007/0268181 | A1 | 11/2007 | Howard et al. |
| 2008/0089396 | A1* | 4/2008 | Zhang ............ H04B 7/0617 375/220 |
| 2008/0095268 | A1 | 4/2008 | Aldana |
| 2009/0203376 | A1* | 8/2009 | Sambhwani ....... H04J 11/0069 455/434 |
| 2010/0074237 | A1 | 3/2010 | Ahn et al. |
| 2010/0091675 | A1 | 4/2010 | Sawai |
| 2010/0172425 | A1* | 7/2010 | Pare, Jr. ............ H04B 7/0632 375/260 |
| 2011/0194475 | A1* | 8/2011 | Kim ................. H04L 1/0053 370/311 |
| 2012/0039196 | A1 | 2/2012 | Zhang |

OTHER PUBLICATIONS

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, pp. 1-83 (Sep. 1999).

IEEE Std 802.11a-1999 (R2003) (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, (1999) Reaffirmed (Jun. 12, 2003).

IEEE Std 802.11b-1999 (Supplement to ANSI/IEEE Std 802.11, 1999 Edition) "Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications: Higher-speed Physical Layer Extension in the 2.4 GHZ Band," *The Institute of Electrical and Electronics Engineers, Inc.*, pp. 1-89 (Sep. 1999).

IEEE Std 802.11b-1999/Cor 1-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band—Corrigendum 1," *The Institute of Electrical and Electronics Engineers, Inc.*, pp. 1-23 (Nov. 7, 2001).

IEEE Std 802.11g/D2.8, May 2002 (Supplement to ANSI/IEEE Std 802.11, 1999 Edition) "Draft Supplement to Standard [for] Information technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band," *The Institute of Electrical and Electronics Engineers, Inc.*, pp. 1-53 (May 2002).

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, pp. 1-69 (Apr. 2003).

IEEE P802.11n™/D3.00, "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, pp. 1-544 (Sep. 2007).

IEEE Std. 802.11 n™ "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 (Oct. 2009).

IEEE Std P802.11-REVma/06.0, (Revision of IEEE Std 802.11-1999) "Unapproved Draft Standard for Information Technology—Telecommunications and information exchange between systems—Local and metropolitan area network—Specific requirements Part 11: Wireless LAN Medium Access Control (MAC) and Physical Layer (PHY) specifications," (This document reflects the combining of the 2003 Edition of 802.11 plus the 802.11 g, 802.11 h, 802.11 i and 802.11j Amendments) (Superseded by P802.11-REVma_D7.0), pp. 1-1212 (2006).

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, pp. 1-1184 (Jun. 12, 2007).

IEEE Std 802.16a-2003 (Amendment to IEEE Std 802.16-2001) "IEEE Standard for Local and metropolitan area networks: Part 16: Air Interface for Fixed Broadband Wireless Access Systems—Amendment 2: Medium Access Control Modifications and Additional Physical Layer Specifications for 2-11 GHZ," *The Institute of Electrical and Electronics Engineers, Inc.*, pp. 1-292 (Apr. 1, 2003).

IEEE Std 802.16-2004 (Revision of IEEE Std 802.16-2001), "IEEE Standard for Local and metropolitan area networks; Part 16: Air Interface for Fixed Broadband Wireless Access Systems," The Institute of Electrical and Electronics Engineers, Inc., 893 pages (Oct. 1, 2004).

IEEE P802.16Rev2/D5 (Jul. 2008) (Revision of IEEE Std 802.16-2004 and consolidates material from IEEE Std 802.16e-2005, Std 802.16-2004/Cor1-2005, Std 802.16f-2005 and Std 802.16g-2007) "Draft Standard for Local and metropolitan area networks: Part 16: Air Interface for Broadband Wireless Access Systems," *The Institute of Electrical and Electronics Engineers, Inc.*, pp. 1-1970 (Jun. 2008).

IEEE Std 802.16 2009 (Revision of IEEE Std. 802.16-2004), "IEEE Standard for Local and metropolitan area networks: Part 16: Air Interface for Broadband Wireless Access Systems," The Institute of Electrical and Electronics Engineers, Inc., 2082 pages (May 29, 2009).

IEEE Std 802.16e-2005 and IEEE Std 802.16-2004/Cor1-2005 (Amendment and Corrigendum to IEEE Std 802.16-2004), IEEE

(56) References Cited

OTHER PUBLICATIONS

Standard for Local and metropolitan area networks: Part 16: Air Interface for Fixed and Mobile Broadband Wireless Access Systems: Amendment 2: Physical and Medium Access Control Layers for Combined Fixed and Mobile Operation in Licensed Bands and Corrigendum 1, *The Institute of Electrical and Electronics Engineers, Inc.*, pp. 1-864 (Feb. 28, 2006).

IEEE 802.20-PD-06; IEEE P 802.20TMV14, Draft 802.20 Permanent Document; <System Requirements for IEEE 802.20 Mobile Broadband Wireless Access Systems—Version 14>, 24 pages (Jul. 16, 2004).

Ansari, et al., "Unified MIMO Pre-Coding Based on Givens Rotation," The Institute of Electrical and Electronics Engineers, doc. No. IEEE C802.16e-04/516r2, pp. 1-13 (Jan. 11, 2005).

Chen, "Home Network Basis: Transmission Environments and Wired/Wireless Protocols," Prentice Hall, 26 pages (Jul. 2003).

Hiertz, et al., "The IEEE 802.11 Universe," IEEE Communications Magazine, pp. 62-70 (Jan. 2010).

Love et al., "An Overview of Limited Feedback in Wireless Communication Systems," IEEE J. on Selected Areas in Communications, vo. 26, No. 8, pp. 1341-1365 (Oct. 2008).

Mujtaba, S.A. "IEEE P802.11—Wireless LANs, TGn Sync Proposal Technical Specification," *The Institute of Electrical and Electronics Engineers, Inc.*, doc.: IEEE 802.11—04/0889r6, pp. 1-131 (May 2005).

van Nee, et al. "The 802.11n MIMO-OFDM Standard for Wireless LAN and Beyond," Wireless Personal Communications, vol. 37, pp. 445-453 (Jun. 2006).

Zhang et al., "11ac Explicit Sounding and Feedback", *The Institute of Electrical and Electronics Engineers*, doc. No. IEEE 802.11-10/1105r0, 44 pages (Sep. 2010).

Office Action in U.S. Appl. No. 13/077,485, dated Apr. 15, 2013 (30 pages).

Office Action in U.S. Appl. No. 13/077,485, dated Nov. 22, 2013 (30 pages).

Notice of Allowance in U.S. Appl. No. 13/077,485, dated Jun. 2, 2014 (15 pages).

\* cited by examiner

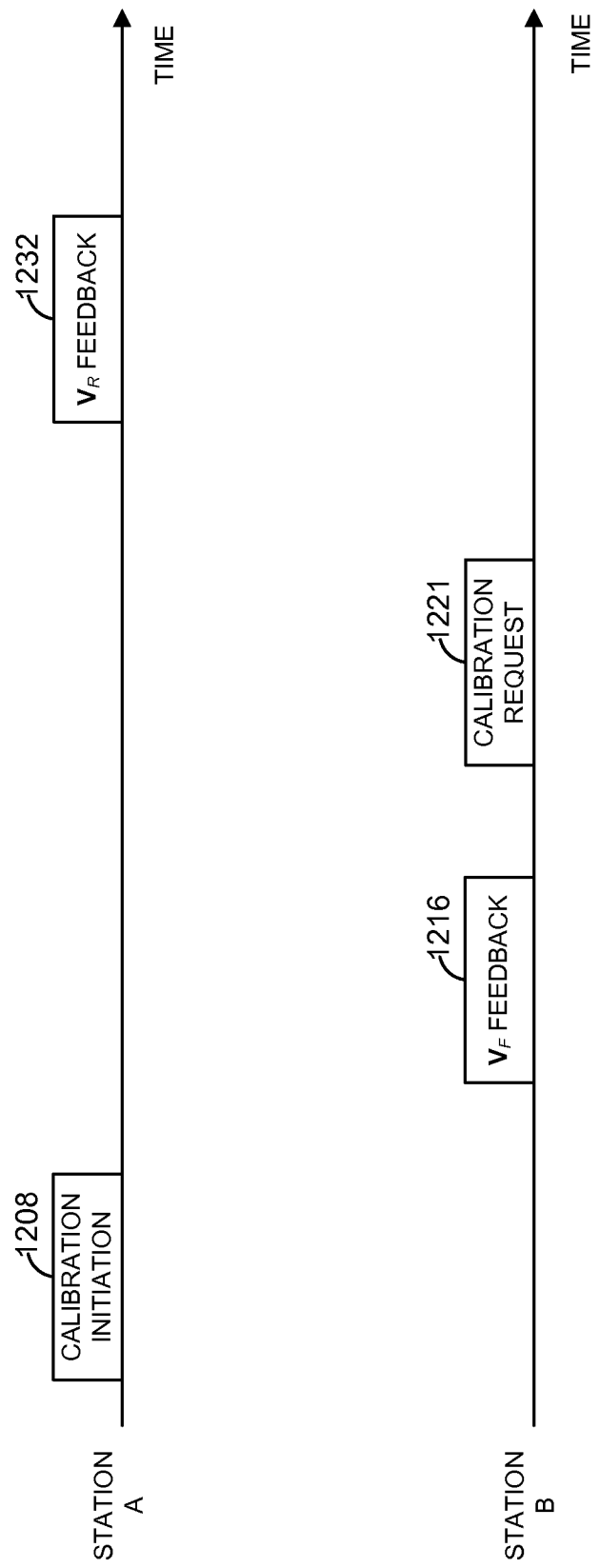

CALIBRATION CORRECTION FOR IMPLICIT BEAMFORMER USING AN EXPLICIT BEAMFORMING TECHNIQUE IN A WIRELESS MIMO COMMUNICATION SYSTEM

RELATED APPLICATION

This is a regular-filed application, which claims the benefit of U.S. Provisional Patent Application Ser. No. 61/769,412, filed Feb. 26, 2013, entitled "Calibration Correction For Implicit Beamformer Using An Explicit Beamforming Technique In A Wireless MIMO Communication System," and is a Continuation-in-Part of U.S. patent application Ser. No. 13/077,485, filed Mar. 31, 2011, entitled "Calibration Correction For Implicit Beamformer Using An Explicit Beamforming Technique In A Wireless MIMO Communication System," which itself claims the benefit of U.S. Provisional Patent Application No. 61/321,046, entitled "Implicit TxBF Calibration With Explicit TxBF," which was filed on Apr. 5, 2010, the entire disclosures of all of which are hereby incorporated by reference herein.

FIELD OF TECHNOLOGY

The present invention relates generally to wireless communication systems and, more particularly, to a system and method for beamforming while transmitting information in a wireless communication system with multiple transmit antennas and multiple receive antennas.

DESCRIPTION OF THE RELATED ART

An ever-increasing number of relatively cheap, low power wireless data communication services, networks and devices have been made available over the past number of years, promising near wire speed transmission and reliability. Various wireless technologies are described in detail in the 802.11 IEEE Standard, including for example, the IEEE Standard 802.11 (1999) and its updates and amendments, the IEEE Standard 802.11a/g (2003), as well as the IEEE Standard 802.11n now adopted, all of which are collectively incorporated herein fully by reference. These standards have been or are in the process of being commercialized with the promise of 54 Mbps (802.11a/g) up to 600 Mbps (802.11n) effective bandwidth, making them a strong competitor to traditional wired Ethernet and the more ubiquitous "802.11b" or "WiFi" 11 Mbps mobile wireless transmission standard.

Generally speaking, transmission systems compliant with the IEEE 802.11a and 802.11g or "802.11a/g" as well as the 802.11n standards achieve their high data transmission rates using Orthogonal Frequency Division Modulation or OFDM encoded symbols mapped up to a 64 quadrature amplitude modulation (QAM) multi-carrier constellation. In a general sense, the use of OFDM divides the overall system bandwidth into a number of frequency sub-bands or channels, with each frequency sub-band being associated with a respective sub-carrier upon which data may be modulated. Thus, each frequency sub-band of the OFDM system may be viewed as an independent transmission channel within which to send data, thereby increasing the overall throughput or transmission rate of the communication system.

Transmitters used in the wireless communication systems that are compliant with the aforementioned 802.11a/802.11g/802.11n standards as well as other standards such as the 802.16a/d/e/m IEEE Standards, typically perform multi-carrier OFDM symbol encoding (which may include error correction encoding and interleaving), convert the encoded symbols into the time domain using Inverse Fast Fourier Transform (IFFT) techniques, and perform digital to analog conversion and conventional radio frequency (RF) upconversion on the signals. These transmitters then transmit the modulated and upconverted signals after appropriate power amplification to one or more receivers, resulting in a relatively high-speed time domain signal with a large peak-to-average ratio (PAR).

Likewise, the receivers used in the wireless communication systems that are compliant with the aforementioned 802.11a/802.11g/802.11n and 802.16a IEEE standards typically include an RF receiving unit that performs RF downconversion and filtering of the received signals (which may be performed in one or more stages), and a baseband processor unit that processes the OFDM encoded symbols bearing the data of interest. The digital form of each OFDM symbol presented in the frequency domain is recovered after baseband downconverting, conventional analog to digital conversion and Fast Fourier Transformation of the received time domain analog signal. Thereafter, the baseband processor performs demodulation (phase rotation) and frequency domain equalization (FEQ) to recover the transmitted symbols, and these symbols are then processed in a Viterbi decoder to estimate or determine the most likely identity of the transmitted symbol. The recovered and recognized stream of symbols is then decoded, which may include deinterleaving and error correction using any of a number of known error correction techniques, to produce a set of recovered signals corresponding to the original signals transmitted by the transmitter.

In wireless communication systems, the RF modulated signals generated by the transmitter may reach a particular receiver via a number of different propagation paths, the characteristics of which typically change over time due to the phenomena of multi-path and fading. Moreover, the characteristics of a propagation channel differ or vary based on the frequency of propagation. To compensate for the time varying, frequency selective nature of the propagation effects, and generally to enhance effective encoding and modulation in a wireless communication system, each receiver of the wireless communication system may periodically develop or collect channel state information (CSI) for each of the frequency channels, such as the channels associated with each of the OFDM sub-bands discussed above. Generally speaking, CSI is information describing one or more characteristics of each of the OFDM channels (for example, the gain, the phase and the SNR of each channel). Upon determining the CSI for one or more channels, the receiver may send this CSI back to the transmitter, which may use the CSI for each channel to precondition the signals transmitted using that channel so as to compensate for the varying propagation effects of each of the channels.

An important part of a wireless communication system is therefore the selection of the appropriate data rates, and the coding and modulation schemes to be used for a data transmission based on channel conditions. Generally speaking, it is desirable to use the selection process to maximize throughput while meeting certain quality objectives, such as those defined by a desired frame error rate (FER), latency criteria, etc.

To further increase the number of signals that may be propagated in the communication system and/or to compensate for deleterious effects associated with the various propagation paths, and to thereby improve transmission performance, it is known to use multiple transmission and receive antennas within a wireless transmission system. Such a system is commonly referred to as a multiple-input, multiple-output (MIMO) wireless transmission system and is specifically provided for within the 802.11n IEEE Standard now being adopted. As is known, the use of MIMO technology produces significant increases in spectral efficiency and link reliability, and these benefits generally increase as the number of transmission and receive antennas within the MIMO system increases.

In addition to the frequency channels created by the use of OFDM, a MIMO channel formed by the various transmit and receive antennas between a particular transmitter and a particular receiver includes a number of independent spatial channels. As is known, a wireless MIMO communication system can provide improved performance (e.g., increased transmission capacity) by utilizing the additional dimensionalities created by these spatial channels for the transmission of additional data. Of course, the spatial channels of a wideband MIMO system may experience different channel conditions (e.g., different fading and multi-path effects) across the overall system bandwidth and may therefore achieve different SNRs at different frequencies (i.e., at the different OFDM frequency sub-bands) of the overall system bandwidth. Consequently, the number of information bits per modulation symbol (i.e., the data rate) that may be transmitted using the different frequency sub-bands of each spatial channel for a particular level of performance may differ from frequency sub-band to frequency sub-band.

However, instead of using the different transmit and receive antennas to form separate spatial channels on which additional information is sent, better reception properties can be obtained in a MIMO system by using each of the various transmit antennas of the MIMO system to transmit the same signal while phasing (and amplifying) this signal as it is provided to the various transmission antennas to achieve beamforming or beamsteering. Generally speaking, beamforming or beamsteering creates a spatial gain pattern having one or more high gain lobes or beams (as compared to the gain obtained by an omni-directional antenna) in one or more particular directions, while reducing the gain over that obtained by an omni-directional antenna in other directions. If the gain pattern is configured to produce a high gain lobe in the direction of each of the receiver antennas, the MIMO system can obtain better reception reliability between a particular transmitter and a particular receiver, over that obtained by single transmitter-antenna/receiver-antenna systems.

There are many known techniques for determining a steering matrix specifying the beamsteering coefficients that need to be used to properly condition the signals being applied to the various transmission antennas so as to produce the desired transmit gain pattern at the transmitter. As is known, these coefficients may specify the gain and phasing of the signals to be provided to the transmission antennas to produce high gain lobes in particular or predetermined directions. These techniques include, for example, transmit-MRC (maximum ratio combining) and singular value decomposition (SVD). An important part of determining the steering matrix is taking into account the specifics of the channel between the transmitter and the receiver, referred to herein as the forward channel. As a result, steering matrixes are typically determined based on the CSI of the forward channel. However, to determine the CSI or other specifics of the forward channel, the transmitter must first send a known test or calibration signal to the receiver, which then computes or determines the specifics of the forward channel (e.g., the CSI for the forward channel) and then sends the CSI or other indications of the forward channel back to the transmitter, thereby requiring signals to be sent both from the transmitter to the receiver and then from the receiver back to the transmitter in order to perform beamforming in the forward channel. Moreover, this exchange must occur each time the forward channel is determined (e.g., each time a steering matrix is to be calculated for the forward channel). This determination of the steering matrix based on the transmitting sending a calibration signal and receiving a CSI or other indication is known as explicit beamforming.

To reduce the amount of startup exchanges required to perform beamforming based on CSI or other channel information, it is known to perform implicit beamforming in a MIMO communication system. With implicit beamforming, the steering matrix is calculated or determined based on the assumption that the forward channel (i.e., the channel from the transmitter to the receiver in which beamforming is to be accomplished) can be estimated from the reverse channel (i.e., the channel from the receiver to the transmitter). In particular, the forward channel can ideally be estimated as the matrix transpose of the reverse channel. Thus, in the ideal case, the transmitter only needs to receive signals from the receiver to produce a steering matrix for the forward channel, as the transmitter can use the signals from the receiver to determine the reverse channel, and can simply estimate the forward channel as a matrix transpose of the reverse channel. As a result, implicit beamforming reduces the amount of startup exchange signals that need to be sent between a transmitter and a receiver because the transmitter can estimate the forward channel based solely on signals sent from the receiver to the transmitter.

Unfortunately, however, radio frequency (RF) chain impairments in the form of gain/phase imbalances and coupling losses impair the ideal reciprocity between the forward and the reverse channels, making it necessary to perform additional calibration exchanges each time the forward channel is being determined, to account for these impairments. In any event, these RF chain impairments render the use of implicit beamforming (which estimates the forward channel based solely on an estimate of the reverse channel) inferior in practice.

SUMMARY

In one embodiment, a method of beamforming within a communication system having (i) a first transceiver device having a first plurality of antennas and (ii) a second transceiver device having a second plurality of antennas, the method includes: transmitting, from the first transceiver device to the second transceiver device, via a forward channel a first calibration signal requesting a non-sounding packet from the second transceiver device, where the non-sounding packet from the second transceiver device is to include a description of the forward channel; receiving, at the first transceiver device, via a reverse channel the non-sounding packet from the second transceiver device; receiving, at the first transceiver device from the second transceiver device, via the reverse channel a second calibration signal requesting a non-sounding packet from the first transceiver device, where the non-sounding packet from the first transceiver device is to include a description of the reverse channel; determining, at the first transceiver device, (i) a partial dimensional description of the reverse channel based on receipt of the non-sounding packet from the second transceiver device or (ii) a full dimensional description of the reverse channel based on receipt of the second calibration signal requesting the non-sounding packet from the first transceiver device; and determining, at the first transceiver device, a first device correction matrix from the received non-sounding packet from the second transceiver device and (i) the partial dimensional description of the reverse channel or (ii) full dimensional description of the reverse channel, wherein the first transceiver is to use the correction matrix to process signals to be transmitted via the forward channel, where the first device correction matrix is for use in transmitting data via the forward channel.

In another embodiment, a wireless transceiver for transmitting signals to one or more other communication devices, the wireless transceiver includes: a multiplicity of antennas; a beamforming network coupled to the multiplicity of antennas; a controller coupled to the beamforming network, the controller to control the beamforming network using a steering matrix and to use a correction matrix to process signals to be transmitted via a forward channel; and a channel estimation unit to receive a forward channel non-sounding packet that includes an estimated dimensional description of the forward channel, and estimate a dimensional description of the reverse channel based on the estimated dimensional description of the forward channel, a correction matrix calculation unit to develop the correction matrix from the estimated dimensional description of the forward channel and the estimated dimensional description of the reverse channel, wherein the controller is configured to transmit the estimated dimensional description of the reverse channel in response to a request from one of the one or more of the other communication devices.

BRIEF DESCRIPTION OF THE DRAWINGS

FIG. 17 is a timing diagram illustrating communications between a Station A and a Station B during the bi-directional calibration method of FIG. 16;

DETAILED DESCRIPTION

While the beamforming techniques described herein for processing and effecting a wireless data transmission are described as being used in communication systems that use one of the IEEE Standard 802.11x communication standards, these techniques may be used in various other types of wireless communication systems and are not limited to those conforming to one or more of the IEEE Standard 802.11x standards. For example, these techniques may be used in communications based on the IEEE 802.16e, 802.16j, or 802.16m standards (known as "WiMAX") and others.

Figure 1:
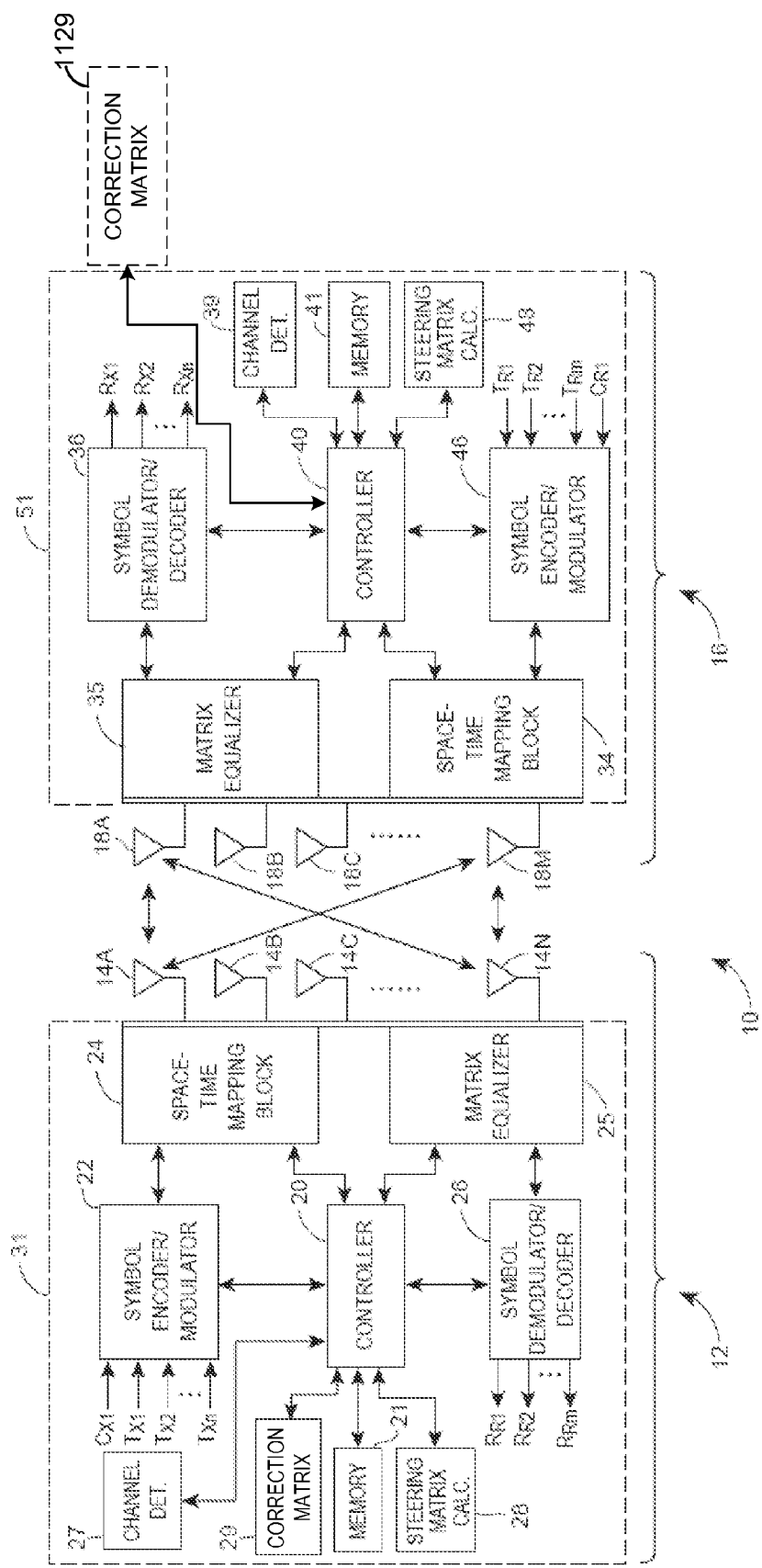
FIG. 1 is a block diagram of a wireless MIMO communication or transmission system that determines and uses a correction matrix as part of an implicit beamforming technique used in a transmitter of the MIMO communication system.

Referring now to FIG. 1, a MIMO communication system 10 is illustrated in block diagram form as generally including a single transceiver device 12 (hereinafter referred to as transmitter 12) having multiple transmission antennas 14A-14N and a single transceiver device 16 (hereinafter referred to as receiver 16) having multiple receiver antennas 18A-18M. The number of transmission antennas 14A-14N can be the same as, more than, or less than the number of receiver antennas 18A-18M. As shown in FIG. 1, the transmitter 12 may include a controller 20 coupled to a memory 21, a symbol encoder and modulator unit 22 and a space-time filtering or mapping block 24, also referred to herein as a transmit beamforming network. The transmitter 12 may also include a matrix equalizer 25 and a symbol demodulator and decoder unit 26 to perform demodulation and decoding of signals received via the antennas 14A-14N in a receive mode. Additionally, the transmitter 12 includes a steering matrix calculation unit 28 and a correction matrix calculation unit 29. As will be understood, the processing applied at the transmitter 12 may be based on, for example, the CSI developed by the transmitter 12 in response to a reception of a test or control signal $C_{R1}$ sent by the receiver 16. In particular, a controller 40 or other unit within the receiver 16, such as a channel determination unit 27, may process the received control signal $C_{R1}$ and develop therefrom a measured description of the reverse channel between the transmitter 12 and the receiver 16 by determining or characterizing the propagation effects of the reverse channel on the signal $C_{R1}$ as it traveled through the reverse channel.

The controller 20 may be any desired type of controller and may be implemented as one or more standard multi-purpose, programmable processors, such as micro-processors, as application specific integrated circuits (ASICs), or may be implemented using any other desired types of hardware, software and/or firmware. The channel determination unit 27, the steering matrix calculation unit 28 and the correction matrix calculation unit 29 may be implemented as one or more custom integrated circuits, ASICs, field programmable gate arrays (FPGAs), programmable logic arrays (PLAs), programmable processors, such as micro-processors or digital signal processing processors, or may be implemented using any other desired types of hardware, software and/or firmware. Likewise, the space-time mapping block 24 or beamforming network, and the matrix equalizer 25 may be implemented using known or standard hardware and/or software elements. If desired, various of the transmitter components, such as the controller 20, the modulator unit 22, the demodulator unit 26, the channel determination unit 27, the steering matrix calculation unit 28, the correction matrix calculation unit 29, the space-time mapping block 24 and the matrix equalizer 25 may be implemented in the same or in different hardware devices, such as in the same or different processors. Additionally, each of these components of the transmitter 12 may be disposed in a housing 31 (shown in dotted relief in FIG. 1) and the routines or instructions for implementing the functionality of any of these components may be stored in the memory 21 or within other memory devices associated with the individual hardware used to implement these components.

During operation, information signals $T_{x1}$-$T_{xn}$ which are to be transmitted from the transmitter 12 to the receiver 16 are provided to the symbol encoder and modulator unit 22 for encoding and modulation. Of course, any desired number of signals $T_{x1}$-$T_{xn}$ may be provided to the modulator unit 22, with this number generally being limited by the modulation scheme used by and the bandwidth associated with the MIMO communication system 10. Additionally, the signals $T_{x1}$-$T_{xn}$ may be any type of signals, including analog or digital signals, and may represent any desired type of data or information. Additionally, if desired, a known test or control signal $C_{x1}$ (which may be stored in the memory 21) may be provided to the symbol encoder and modulator unit 22 for use in determining CSI related information describing the characteristics of the channel(s) between the transmitter 12 and the receiver 16. If desired, the same control signal or a different control signal may be used to determine the CSI for each frequency and/or spatial channel used in the MIMO communication system 10.

The symbol encoder and modulator unit 22 may interleave digital representations of the various signals $T_{x1}$-$T_{xn}$ and $C_{x1}$ and may perform any other known type(s) of error-correction encoding on the signals $T_{x1}$-$T_{xn}$ and $C_{x1}$ to produce one or more streams of symbols to be modulated and sent from the transmitter 12 to the receiver 16. While the symbols may be modulated using any desired or suitable QAM technique, such as using 64 QAM, these symbols may be modulated in any other known or desired manner including, for example, using any other desired phase and/or frequency modulation techniques. In any event, the modulated symbol streams are provided by the symbol encoder and modulator unit 22 to the space-time mapping block 24 for processing before being transmitted via the antennas 14A-14N. While not specifically shown in FIG. 1, the modulated symbol streams may be up-converted to the RF carrier frequencies associated with an OFDM technique (in one or more stages) before being processed by the space-time mapping block 24 in accordance with a beamforming technique more specifically described herein. Upon receiving the modulated signals, the space-time mapping block 24 or beamforming network processes the modulated signals by injecting delays and/or gains into the modulated signals based on a steering matrix provided by the controller 12, to thereby perform beamsteering or beamforming via the transmission antennas 14A-14N.

The signals transmitted by the transmitter 12 are received by the receiver antennas 18A-18M and may be processed by a matrix equalizer 35 within the receiver 16 to enhance the reception capabilities of the antennas 18A-18M. As will be understood, the processing applied at the receiver 16 (as well as at the transmitter 12) may be based on, for example, the CSI developed by the receiver 16 in response to the transmission of the test or control signal $C_{x1}$. In particular, a controller 40 or other unit within the receiver 16, such as a channel determination unit 39, may process the received control signal $C_{x1}$ and develop therefrom a measured description of the forward channel between the transmitter 12 and the receiver 16 by determining or characterizing the propagation effects of the forward channel on the signal $C_{x1}$ as the signal $C_{x1}$ traveled through the forward channel. In any event, a symbol demodulator and decoder unit 36, under control of the controller 40, may decode and demodulate the received symbol strings as processed by the matrix equalizer 35. In this process, these signals may be downconverted to baseband. Generally, the demodulator and decoder unit 36 may operate to remove effects of the forward channel based on the CSI as well as to perform demodulation on the received symbols to produce a digital bit stream. In some cases, if desired, the symbol demodulator and decoder unit 36 may perform error correction decoding and deinterleaving on the bit stream to produce the received signals $R_{x1}$-$R_{xn}$ corresponding to the originally transmitted signals $T_{x1}$-$T_{xn}$.

As shown in FIG. 1, the receiver 16 may also include a memory 41 and a symbol encoder and modulator unit 46 which may receive one or more signals $T_{R1}$-$T_{Rm}$ which may be encoded and modulated using any desired encoding and modulation techniques. The receiver 16 may also provide one or more known test or control signals $C_{R1}$ to the symbol encoder/modulator unit 46 to be sent to the transmitter 12 to enable the transmitter 12 to determine a measured description of the reverse channel between the receiver 16 and the transmitter 12. The encoded and modulated symbol stream may then be upconverted and processed by a space-time mapping block 34 to perform beamsteering based on a steering matrix developed by a steering matrix calculation unit 48, prior to being transmitted via the receiver antennas 18A-18N to, for example, the transmitter 12, thereby implementing the reverse link. As shown in FIG. 1, each of the receiver components may be disposed in a housing 51.

The matrix equalizer 25 and the demodulator/decoder unit 26 within the transmitter 12 operate similarly to the matrix equalizer 35 and the demodulator/decoder unit 36 of the receiver 16 to demodulate and decode the signals transmitted by the receiver 16 to produce the recovered signals $R_{R1}$-$R_{Rm}$. Here again, the matrix equalizer 25 may process the received signals in any known manner to enhance the separation and therefore the reception of the various signals transmitted by the antennas 18A-18M. Of course, the CSI or other measured description of the forward channel for the various OFDM channel(s) may be used by the steering matrix calculation units 28 and 48 as well as by the controllers 20 and 40 to perform beamforming and to determine a steering matrix used by the space-time mapping blocks 24, 34. As noted above, the CSI, beamforming and other programs and data such as the steering matrix used by the units 28 and 48 and by the controllers 20 and 40, a correction matrix determined by the correction matrix calculation unit 29, etc. may be stored in the memories 21 and 41.

As is generally known, beamforming or beamsteering typically includes applying appropriate phases and gains to the various signals as sent through the multiple transmission antennas 14A-14N, in a manner which causes the signals sent from the different transmission antennas 14A-14N to constructively interact (add in phase) in certain predetermined directions and to deconstructively interact (cancel) in other directions. Thus, beamsteering typically produces a beam pattern having high gain regions (referred to as high gain lobes) in various predetermined directions and low gain regions (typically referred to as nulls) in other directions. The use of beamforming techniques in a MIMO system enables a signal to be sent with high gain (as compared to an omni-directional antenna) in certain directions, and to be sent with low gain (as compared to an omni-directional antenna) in other directions. Thus, in the MIMO system 10 of FIG. 1, beamforming may be used to enhance signal directivity towards the receiver antennas 18A-18M, which improves the SNR of the transmissions and results in more reliable transmissions. In this case, the beamforming technique will generally form high gain lobes in the direction of propagation at which the highest gain is desired, and in particular in the directions of propagation from the transmitter 12 to each of the receiver antennas 18A-18M of the receiver 16 or to the receiver 16 in general.

To implement beamforming in the transmitter 12, the steering matrix calculation unit 28 may determine or calculate a set of matrix coefficients (referred to herein as a steering matrix) which are used by the space-time mapping block or beamforming network 24 to condition the signals being transmitted by the antennas 14A-14N. Generally speaking, the steering matrix for any particular frequency channel of the MIMO system 10 (in the forward channel between the transmitter 12 and the receiver 16) may be determined by the steering matrix calculation unit 28 based on the CSI determined for that forward channel. In this case, the steering matrix calculation unit 28 may use any desired beam steering or matrix computation techniques, such as transmit-MRC or SVD techniques, to compute the steering matrix. As these techniques are well known in the art, they will not be discussed in detail herein.

However, as is known, to actually determine the CSI or other measured description of the forward channel, i.e., for the channel from the transmitter 12 to the receiver 16, the transmitter 12 generally sends a known control or test signal to the receiver 16 (e.g., the signal $C_{x1}$) and the receiver 16 may then determine the CSI or other measured description of the forward channel and send this information back to the transmitter 12 as part of a payload of a transmission. In the event of explicit beamforming, in this case, the transmitter 12 must first send a test or control signal to the receiver 16, which then determines a measured description of the forward channel and sends this description of the forward channel from the receiver 16 back to the transmitter 12. This characterization of the forward channel thereby requires, each time the steering matrix is computed, multiple communications between the transmitter 12 and the receiver 16 so as to enable the transmitter 12 to obtain the CSI or other description of the forward channel used to develop the steering matrix to be used in the forward channel. In explicit transmit beamforming, RF chain imbalance should not impact the beamforming performance, as the forward channel is explicitly known. Additionally, in the case of implicit beamforming, to avoid the use of multiple communication between a particular transmitter/receiver pair each time a steering matrix is to be computed for the forward channel, the transmitter 12 may determine the CSI or other measured description of the reverse channel, i.e., the channel from the receiver 16 to the transmitter 12, from the signal(s) sent from the receiver 16 including, for example the known test or control signal $C_{R1}$. Based on the CSI or other measured description of the reverse channel, the transmitter 12 may calculate the steering matrix for the forward channel.

To reduce or account for the errors introduced by RF chain impairments in a standard implicit beamforming technique, the transmitter 12 may use a calibration technique that applies a correction matrix during the beamforming process to compensate for measured differences between the actual forward and reverse channels. In particular, this technique first determines a correction matrix as a function of measured descriptions of the forward and the reverse channels. Then, each time a new steering matrix is to be calculated for the forward channel, the beamforming technique applies the correction matrix to a steering matrix determined using a basic implicit beamforming technique, so that, once the correction matrix is determined, the transmitter may simply perform implicit beamforming using a measured description of the reverse channel (i.e., the channel between the receiver and the transmitter) to produce an estimate of the forward channel (i.e., the channel between the transmitter and the receiver). Alternatively, the transmitter 12 may also calculate correction matrices for its receive chains, so that once the correction matrix is determined, the transmitter may apply it to the reverse channel (i.e., the channel from the receiver 16 to the transmitter 12) estimation, and perform implicit beamforming using a measured description of this processed reverse channel estimate to produce an estimate of the forward channel (i.e., the channel from the transmitter 12 to the receiver 16). The calibration procedure may be conducted infrequently, compared with steering matrix updates. For example, it may be conducted only upon association of the device into the network, or upon the changes in the environment (e.g. a change in temperature).

Transmission from the transmitter 12 (Station A) to the receiver 16 (Station B) can be modeled as:

$$y_B = \tilde{H}_{AB} Q_A x_A + n_B, \quad \text{(Equ. 1)}$$

where $y_B$ and $n_B$ are the received signal vector and additive noise vector at Station B, respectively; $\tilde{H}_{AB}$ is the equivalent channel from Station A to Station B; $x_A$ is the signal vector to be transmitted from Station A; and $Q_A$ is the steering matrix (which may be a vector) at Station A that spreads the signal vector onto actual transmitting chains at Station A. $Q_A$ may be designed based on the knowledge of $\tilde{H}_{AB}$ at station A using. In the transmitter 12, the steering matrix $Q_A$ may be determined by the steering matrix calculation unit 28 based, for example, on the CSI determined for the channel from the transmitter 12 to the receiver 16. The steering matrix $Q_A$ may be determined using a variety of techniques, including techniques known to those of ordinary skill in the art In implicit transmit beamforming, Station A determines an estimation of $\tilde{H}_{AB}$ based on an estimate of the channel from Station B to Station A. In the case of time-division duplexing (TDD), the forward link and the reverse link share the same frequency band, so their physical propagation channels, denoted as $H_{AB}$ and $H_{BA}$ respectively, can be assumed reciprocal ($H_{AB}=H_{BA}^T$), if the channel is varying slowly compared to the interval between forward and reverse link transmissions.

However, the actual channels observed at baseband also include the equivalent radio frequency (RF) responses of the transmit and receive chains, which might not be identical for the transmit and receive chains in the same device. This imbalance results in the actual channels $\tilde{H}_{AB}$ and $\tilde{H}_{BA}$ not being reciprocal. The mathematical description of this imbalance issue may be represented as:

$$\tilde{H}_{AB}=C_{B,Rx}H_{AB}C_{A,Tx}, \quad (\text{Equ. 2})$$

where $C_{B,Rx}$ represents the RF responses at the receive chains of Station B; and where $C_{A,Tx}$ represents the RF responses at the transmit chains of Station A. By ignoring the coupling among transmit and receive chains, the matrices $C_{B,Rx}$ and $C_{B,Rx}$ can be approximately modeled as diagonal matrices.

The equivalent channel from Station B to Station A, $\tilde{H}_{BA}$, can be represented as:

$$\tilde{H}_{BA}=C_{A,Rx}H_{AB}^T C_{B,Tx}, \quad (\text{Equ. 3})$$

Due to imbalances between the transmit and receive chains at Station A and at Station B, respectively, i.e., $C_{A,Tx} \neq C_{A,Rx}^T$ and/or $C_{B,Tx} \neq C_{B,Rx}^T$, it stands that $\tilde{H}_{AB} \neq \tilde{H}_{BA}^T$.

One or both devices may compensate the transmit and the receiver RF imbalance at baseband. For example, one or more correction matrices may be calculated and then multiplied with the transmitted or received signal vector in the baseband to correct the imbalance and maintain reciprocity between the transmit and receive channels. For example, a transmitter-side correction matrix $K_{A,Tx}$ and a receiver-side correction matrix $K_{B,Rx}$ are calculated such that they completely compensate for the imbalance. Thus, a corrected equivalent channel from Station A to Station B $\hat{H}_{AB}$ may be represented as:

$$\hat{H}_{AB}=K_{B,Rx}\tilde{H}_{AB}K_{A,Tx}=\alpha\tilde{H}_{BA}^T, \quad (\text{Equ. 4})$$

where $\alpha$ can be any scalar. Equation 4 is indicative of a system that may be referred to as a strict reciprocity system, i.e., a system that offers full calibration at both the transmitter and receiver. To implement a strict reciprocity system, Station A left-multiplies the correction matrix $K_{A,Tx}$ with the signal it is to transmit ($Q_A x_A$) at baseband. Also, upon receiving the signal, Station B left-multiplies the correction matrix $K_{B,Rx}$ with the received signal at baseband.

An alternative approach is to calculate the correction matrices for the reverse channel $K_{A,Rx}$ and/or $K_{B,Tx}$, such that:

$$\hat{H}_{BA}=K_{A,Rx}\tilde{H}_{BA}K_{B,Tx}=\alpha'\tilde{H}_{AB}^T, \quad (\text{Equ. 5})$$

where $\alpha'$ can be any scalar. To implement strict reciprocity, Station B left-multiplies the correction matrix $K_{B,Tx}$ with the reverse channel sounding signal Station B is to transmit at baseband. Upon receiving the signal, Station A left-multiplies the correction matrix $K_{A,Rx}$ with the estimated reverse channel at baseband.

Many implicit transmit beamforming methods only utilize transmitter-side compensation. In these cases, $\hat{H}_{AB}$ may be represented as:

$$\hat{H}_{AB}=\tilde{H}_{AB}K_{A,Tx}=D_B\tilde{H}_{BA}^T, \quad (\text{Equ. 6})$$

where $D_B$ is a diagonal matrix representing the imbalance at Station B. Equation 6 is indicative of a system that may be referred to as a semi-reciprocal system, in this example, because it offers partial calibration on the transmitter. With semi-reciprocity, only transmitter-side compensation need be utilized. To implement a semi-reciprocal system, Station A left-multiplies the correction matrix $K_{A,Tx}$ with the signal it is to transmit ($Q_A x_A$) at baseband. Upon receiving the signal, Station B need not apply a correction matrix, such as the correction matrix $K_{B,Rx}$, with the received signal. Similarly, the transmitter-side compensation may also be applied at the receiver chains of the same device. That is, to realize semi-reciprocity, Station A left-multiplies the correction matrix $K_{A,Rx}$ with the reverse channel estimates at baseband:

$$\hat{H}_{BA}=K_{A,Rx}\tilde{H}_{BA} \quad (\text{Equ. 7})$$

so, $$\hat{H}_{AB}=D'_B\tilde{H}_{BA}^T \quad (\text{Equ. 8})$$

where $K_{A,Rx}=\text{inv}(K_{A,Tx})$. Here we use the forward channel correction (c.f. Equations 1, 2, 3, 4, 5) to illustrate the proposed calibration methods. The extension to reverse channel correction matrix will be straightforward to one of ordinary skill in the art.

Figure 2:
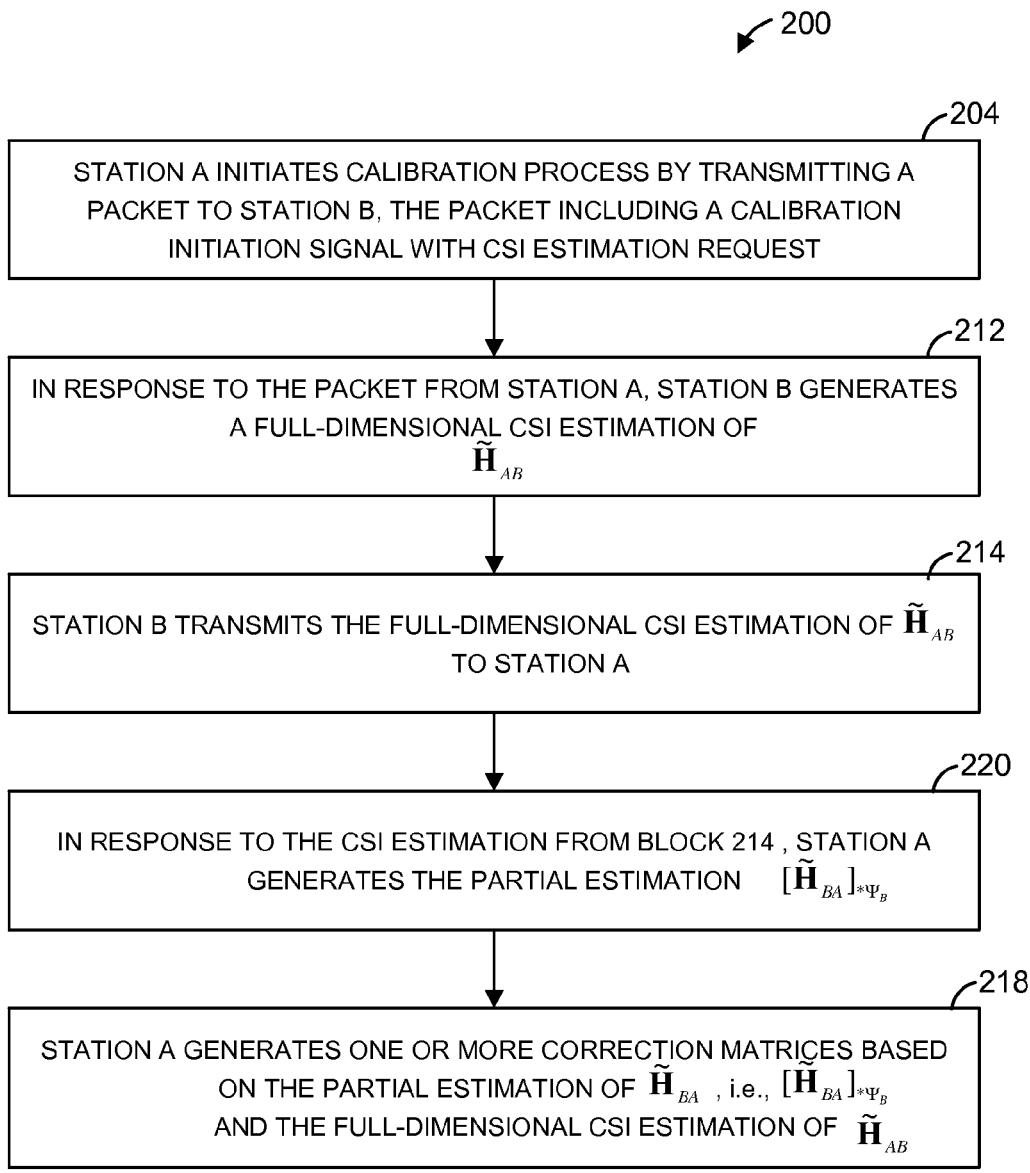
FIG. 2 is a flow diagram of an example method for calibrating a station in a wireless network.
Figure 3:
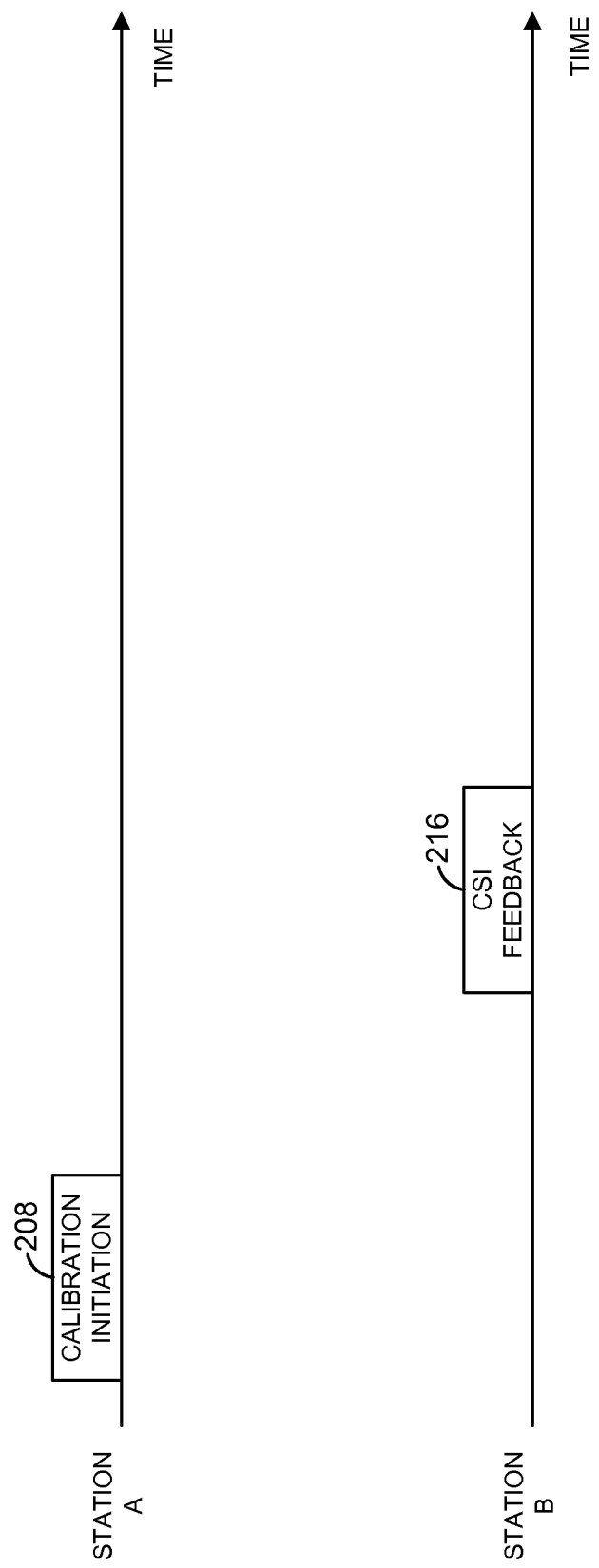
FIG. 3 is a timing diagram illustrating communications between a Station A and a Station B during the calibration method of FIG. 2.

FIG. 2 is a flow diagram of an example method 200 for calibrating a station in a wireless network using an explicit beamforming technique. The method 200 will be described with reference to FIG. 3, which is a timing diagram illustrating communications between a Station A and a Station B during the calibration method 200. At a block 204, Station A initiates a calibration process by sending a packet 208 to Station B. The packet 208 sent at the block 204 includes a "calibration initiation" signal, which indicates to Station B that Station A is requesting to initialize calibration. The calibration initiation signal may be sent at a physical layer or a media access control layer, for example, of a wireless communication protocol. The packet 208 may be a sounding packet, for example.

At a block 212, in response to receiving the packet 208 with the calibration initiation signal, Station B generates a full-dimensional channel state information (CSI) estimation of $\hat{H}_{AB}$. At a block 214, after Station B generates the full-dimensional CSI estimation of $\hat{H}_{AB}$ (block 212), Station B transmits it back to Station A via a CSI feedback packet 216. According to many wireless network protocols, transmission of the CSI feedback packet 216 typically is not considered time critical.

To generate the CSI estimation, Station B sets its spatial steering matrix $Q_B$ to a predetermined $N_{ss\_B} \times N_{ss\_B}$ square matrix, such as the identity matrix I, a Hadamard matrix, a discrete Fourier transform (DFT) matrix, etc., where $N_{ss\_B}$ is the number of data streams transmitted by the CSI feedback packet 216, which could be less than the number of transmit antennas at Station B. For example, using the identity matrix I, Station B uses only a portion of its available antennas to send the CSI feedback packet 216, e.g., using the same number of antennas as there are to be spatial streams in the CSI feedback packet 216. In some examples, Station B will use the same data rate and bandwidth setting (e.g., as set forth in the 802.11n standard) as are in the calibration initial packet (e.g., sounding packet) 208, when sending the CSI feedback packet 216. The CSI feedback packet 216 is a not a sounding packet because it does not include training information for all available spatial dimensions of a multiple-antenna channel. Rather, the CSI feedback packet 216 includes one or more characteristics of $\tilde{H}_{AB}$, e.g., of each of the OFDM channels (for example, the gain, the phase and the SNR of each channel). Such a packet may be referred to as a non-sounding packet, although in the case where Station B uses a single receiver side antenna to transmit the reverse channel CSI feedback packet 216, that packet essentially provides a full sounding of the antenna used.

At a block 218, after receiving the CSI feedback packet 216, Station A calculates the correction matrix $K_{A,Tx}$. For example, at a block 220, from the received CSI feedback packet 216, Station A determines a partial estimate of the reverse channel $[\tilde{H}_{BA}]_{*\Psi_B}$, where $\Psi_B$ indicates the subset of the antennas at Station B. In response to this partial estimation (block 220) and the full-dimension CSI estimation (block 214), the block 218 calculates the correction matrix $K_{A,Tx}$. In other examples, Station A additionally or alternatively calculates a correction matrix $K_{A,Rx}$, e.g., at the block 218. Example methods for generating the correction matrices $K_{A,Tx}$ and $K_{A,Rx}$ will be described below. As shown, even if Station B uses only a subset of its antennas in sending the CSI feedback packet 216, Station A is able to determine the correction matrix, $K_{A,Tx}$.

In some examples, the method 200 of FIG. 2 is implemented by the system 10 of FIG. 1. Of course, in other examples, the method 200 is implemented by other systems. Also, the system 10 need not implement the method 200, but may alternatively implement other methods, includes other methods described herein.

In an example, the controller 20 causes the packet 208 to be sent to the receiver 16 (block 204). The controller 40 causes the CSI feedback packet 216 to be sent to the transmitter 12 (block 214). The channel determination unit 39 generates the full-dimensional CSI estimation of $\tilde{H}_{AB}$ (block 212), and the controller 40 causes this information to be sent back to the transmitter (block 214). The correction matrix calculation unit 29 generates $[\tilde{H}_{BA}]_{*\Psi_B}$ (block 220). The correction matrix calculation unit 29 also generates the one or more correction matrices (block 218). The space-time mapping block 24 left-multiplies the correction matrix $K_{A,Tx}$ with the signal to be transmitted at baseband. Optionally, the steering matrix calculation block 28 modifies the steering matrix $Q_A$ using the correction matrix $K_{A,Tx}$ by, for example, left-multiplying the correction matrix $K_{A,Tx}$ with the steering matrix $Q_A$ to generate a modified steering matrix. Alternatively, the correction matrix calculation unit 29 modifies the steering matrix $Q_A$ using the correction matrix $K_{A,Tx}$. In other examples, the matrix equalizer 25 left-multiplies the correction matrix $K_{A,Rx}$ with the signal it receives from the station 16 at baseband.

Figure 4:
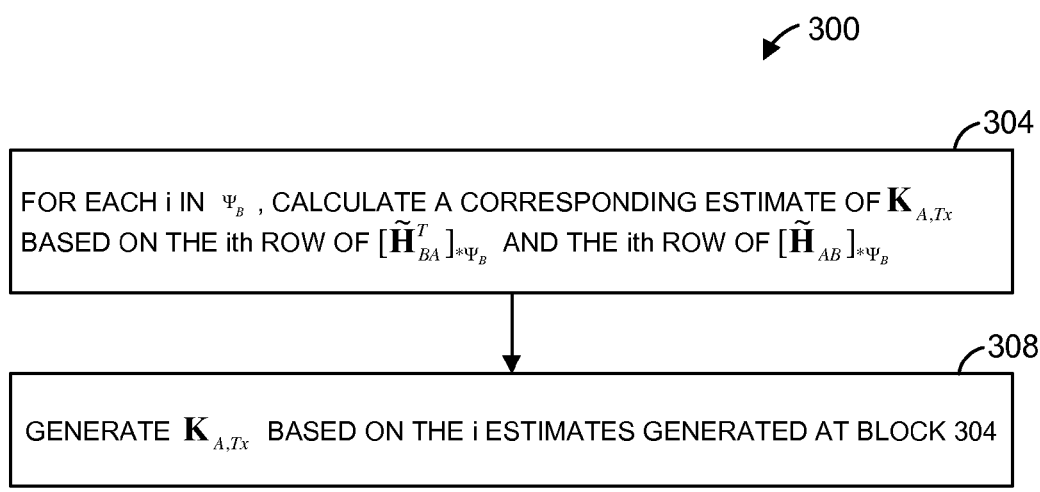
FIG. 4 is a flow diagram of an example method for generating a correction matrix based on a partial estimation of a reverse channel and corresponding information from an estimation of a forward channel.

FIG. 4 is a flow diagram of an example method 300 for generating a correction matrix, $K_{A,Tx}$ or $K_{A,Rx}$, based on the partial estimation of the reverse channel $\tilde{H}_{BA}$ (i.e., $[\tilde{H}_{BA}]_{*\Psi_B}$) and the partial estimation of the forward channel $\tilde{H}_{AB}$ (i.e., $[\tilde{H}_{AB}]_{*\Psi_B}$). In this example method, it is assumed that the correction matrix to be generated, $K_{A,Tx}$, is a diagonal matrix.

At a block 304, for $i \in \Psi_B$, a corresponding estimate of $K_{A,Tx}$ may be calculated based on the i-th row in $[\tilde{H}_{AB}]_{*\Psi_B}$ and the i-th row in $[\tilde{H}_{BA}^T]_{*\Psi_B}$. The k-th element of the i-th row of $[\tilde{H}_{AB}]_{*\Psi_B}$ may be written as:

$$[\tilde{H}_{AB}]_{ki} = c_{B,Rx\_i}[H_{AB}]_{ik} c_{A,Tx\_k}, \qquad \text{(Equ. 9)}$$

Similarly, the k-th element of the i-th row of $[\tilde{H}_{BA}^T]_{*\Psi_B}$ is the k-th element of the i-th column of $[\tilde{H}_{BA}]_{*\Psi_B}$, which may be written as:

$$[\tilde{H}_{BA}]_{ki} = c_{A,Rx\_k}[H_{AB}]_{ik} c_{B,Tx\_i}, \qquad \text{(Equ. 10)}$$

The (k,k) element of the diagonal correction matrix $K_{A,Tx}$ corresponding to i may be determined as:

$$[K_{A,Tx}]_{kk} = \frac{[\tilde{H}_{BA}]_{ki}}{[\tilde{H}_{AB}]_{ik}} = \left(\frac{c_{B,Tx\_i}}{c_{B,Rx\_i}}\right)\frac{c_{A,Rx\_k}}{c_{A,Tx\_k}} = \alpha \frac{c_{A,Rx\_k}}{c_{A,Tx\_k}}, \qquad \text{(Equ. 11)}$$

where $$\alpha = \frac{c_{B,Tx\_i}}{c_{B,Rx\_i}}, \qquad \text{(Equ. 12)}$$

Thus, for example, the (1,1) element of $K_{A,Tx}$ corresponding to i may be determined as:

$$[K_{A,Tx}]_{11} = \frac{[\tilde{H}_{BA}]_{1i}}{[\tilde{H}_{AB}]_{i1}} = \left(\frac{c_{B,Tx\_i}}{c_{B,Rx\_i}}\right)\frac{c_{A,Rx\_1}}{c_{A,Tx\_1}} = \alpha \frac{c_{A,Rx\_1}}{c_{A,Tx\_1}}, \qquad \text{(Equ. 13)}$$

Similarly, the (2,2) element of $K_{A,Tx}$ corresponding to i may be determined as:

$$[K_{A,Tx}]_{22} = \frac{[\tilde{H}_{BA}]_{2i}}{[\tilde{H}_{AB}]_{i2}} = \alpha \frac{c_{A,Rx\_2}}{c_{A,Tx\_2}}, \qquad \text{(Equ. 14)}$$

As can be seen from Equations 11-14, $\hat{H}_{AB} = \tilde{H}_{AB} K_{A,Tx} = \alpha C_{B,Rx} H_{AB} C_{A,Rx} = \alpha D_B \tilde{H}_{BA}^T$, where $D_B = C_{B,Rx} C_{B,Tx}^{-1}$, and the calibrated channels are semi-reciprocal.

At a block 308, the correction matrix $K_{A,Tx}$ is generated based on the i estimates generated at the block 304. As just one example, the correction matrix $K_{A,Tx}$ could be generated base on an average of the i estimates. For instance, the (1,1) element is generated as an average of the i estimates of the (1,1) element generated at the block 304. Similarly, the (2,2) element is generated as an average of the i estimates of the (2,2) element generated at the block 304, etc.

The correction matrix $K_{A,Rx}$ is calculated by inverting the correction matrix $K_{A,Tx}$. Alternatively, the correction matrix $K_{A,Rx}$ calculated according to a method similar to the method 300 and equations similar to Equations 8 and 9. Then, the correction matrix $K_{A,Tx}$ is calculated by inverting the correction matrix $K_{A,Rx}$.

In some examples, block 308 determines only the phase mismatch in calculating the correction matrix $K_{A,Tx}$, for example by averaging over different antenna index i or over different OFDM sub-carriers. In such examples, the diagonal correction matrix $K_{A,Tx}$ is expressed as a phase correction factor where the phase difference between the reverse estimation channel and the forward estimation channel is determined to provide the phase difference for each antenna k of Station A:

$$[K_{A,Tx}]_{kk} = \exp\{j(\angle[\tilde{H}_{BA}]_{ki} - \angle[\tilde{H}_{AB}]_{ik})\}, \forall i \qquad \text{(Equ. 15)}$$

Figure 5:
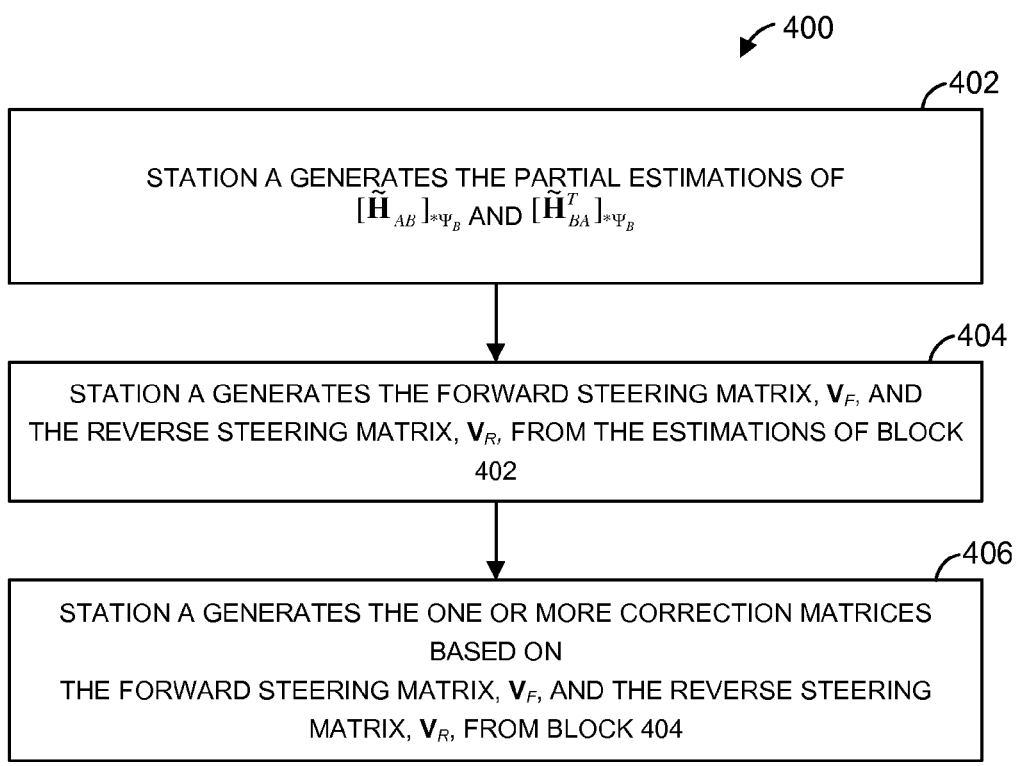
FIG. 5 is a flow diagram of another example method for generating a correction matrix based on determining forward and reverse steering matrices from a partial estimation of a reverse channel and corresponding information from an estimation of a forward channel.

FIG. 5 is a flow diagram of another example method 400 for generating a correction matrix based on the partial estimation of the reverse channel $\tilde{H}_{BA}$ (i.e., $[\tilde{H}_{BA}]*\psi_B$) and the partial estimation of the forward channel $\tilde{H}_{AB}$ (i.e., $[\tilde{H}_{AB}]*\psi_B$).

Block 402 determines the singular matrixes that define the estimate of the forward channel $[\tilde{H}_{AB}]*\psi_B$, the estimate of the reverse channel $[\tilde{H}_{BA}]*\psi_B$. A singular value decomposition (SVD) method or any other method or technique that determines a set of right singular matrixes that accurately describes or defines the forward channel $[\tilde{H}_{AB}]*\psi_B$ and another set of right singular matrixes that accurately describes or defines the estimate of the reverse channel $[\tilde{H}_{BA}]*\psi_B$ may be used. Or, in other examples, the estimate of the reverse channel is determined from inverting the estimate of the forward channel $[\tilde{H}_{AB}]*\psi_B$. A block 404 then determines a forward steering matrix, $V_F$, using a method $f$, and a reverse steering matrix, $V_R$, using the same method $f$ and computes the correction matrix using:

$$V_F = f([\tilde{H}_{AB}]*\psi_B), \quad \text{(Equ. 16)}$$

$$V_R = f([\tilde{H}_{BA}^T]*\psi_B), \quad \text{(Equ. 17)}$$

Block 406 then determines the correction matrix based on the determined forward and backward steering matrices, according to:

$$K_{A,Tx} = V_F V_R^H, \quad \text{(Equ. 18)}$$

In some examples, the diagonal of the calculated correction matrix is made to correspond to pure phase shifts by normalization. For example, the block 406 may express the correction matrix with phase correction only by applying the mathematical formula:

$$K_{A,Tx} = \exp\{j\angle(V_F V_R^H)\} \quad \text{(Equ. 19)}$$

While the foregoing describes determining the correction matrix $K_{A,Tx}$, the correction matrix $K_{A,Rx}$ can be calculated instead, e.g., by inverting the correction matrix $K_{A,Tx}$ determined using Equations 14, 15, 18, or 19. Alternatively, the correction matrix $K_{A,Rx}$ is calculated first according to equations similar Equations 12-19. Then, the correction matrix $K_{A,Tx}$ is calculated by inverting the correction matrix $K_{A,Rx}$.

Figure 6:
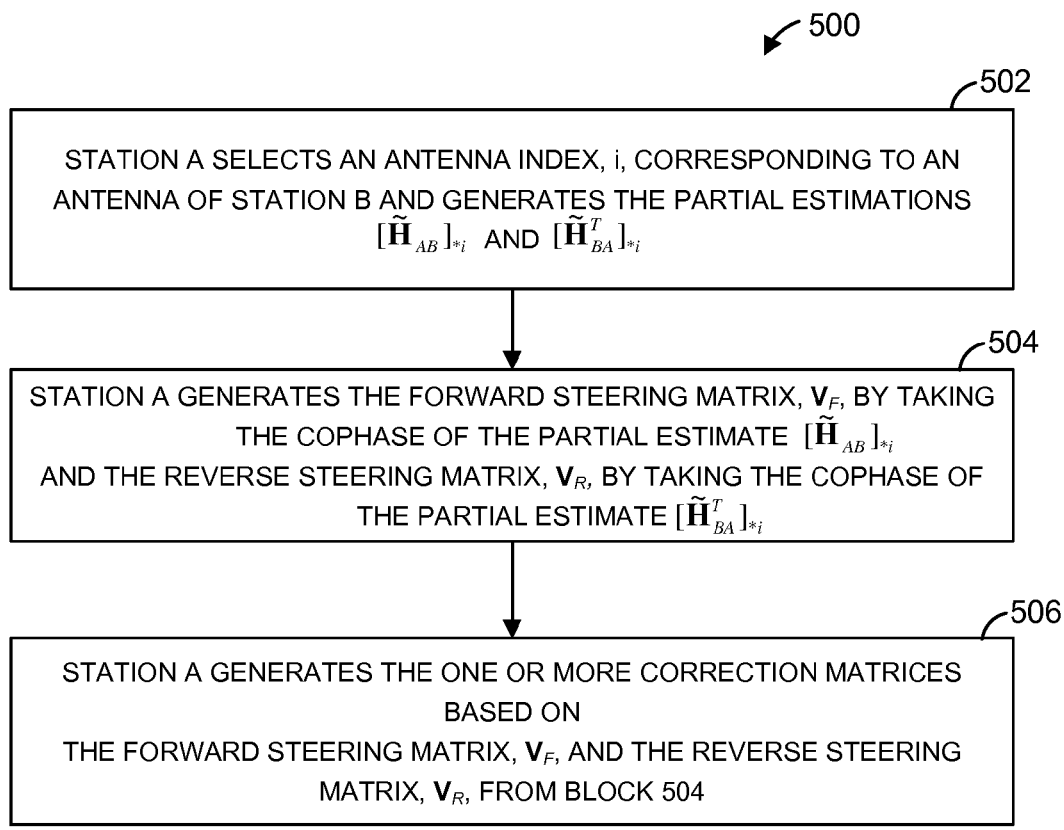
FIG. 6 is a flow diagram of an example implementation of the method of FIG. 5.

FIG. 6 illustrates an example approach 500 to the method 400, and as may be achieved by the blocks 404 and 406 in FIG. 5. Specifically, the block 404 determines the forward steering matrix, $V_F$, and the reverse steering matrix, $V_R$, using a cophasing technique. A block 502 selects one Station B antenna index i. For example, Station A selects the index i corresponding to the Station B antenna with the strongest indicated channel gain from the CSI feedback packet 216. In another example, Station A selects the antenna index i based on row averages.

With the generated partial estimates of the forward and reverse channels, block 504 determines the forward steering matrix $V_F$ by taking a cophasing of the partial estimation $[\tilde{H}_{AB}]*_i$, as indicated by:

$$V_F = cophase([\tilde{H}_{AB}]_{i*}) = \quad \text{(Equ. 20)}$$

$$cophase([h_{i1}^{(F)} h_{i2}^{(F)} \ldots h_{iN_{Tx}}^{(F)}]) = \begin{bmatrix} e^{j\theta_{NTx1}} \\ e^{j\theta_{NTx2}} \\ \vdots \\ 1 \end{bmatrix}.$$

The block 504 also determines the reverse steering matrix $V_R$ by taking a cophasing of the partial estimation $[\tilde{H}_{BA}^T]*_i$, as indicated by: #

$$V_R = cophase([\tilde{H}_{BA}^T]_{i*}) = \quad \text{(Equ. 21)}$$

$$cophase([h_{i1}^{(R)} h_{i2}^{(R)} \ldots h_{iN_{Tx}}^{(R)}]) = \begin{bmatrix} e^{j\psi_{NTx1}} \\ e^{j\psi_{NTx2}} \\ \vdots \\ 1 \end{bmatrix}.$$

By block 502 identifying only a single receive antenna then the channel reduces to a single row, leaving each of $V_F$ and $V_R$ as linear matrices. Block 506, applying Equation 18, produces the correction matrix $K_{A,Tx}$, representing the phase difference between each of the corresponding forward and reverse steering matrices:

$$K_{A,Tx} = V_F V_R^H = \begin{bmatrix} e^{j(\theta_{NTx1} - \psi_{NTx1})} & & & \\ & e^{j(\theta_{NTx2} - \psi_{NTx2})} & & \\ & & \ddots & \\ & & & 1 \end{bmatrix}$$

In terms of calibration architecture, at an implicit calibration beamformer, any of the determinations made above can be performed by the corresponding steering matrix calculator 28 or calibration factor calculator 29, respectively, and performed in either software or hardware or a combination thereof. That is, the forward CSI matrix sent by Station B and the reverse SCI matrix determined by Station A may be sent to either software or hardware within Station A to determine the correction matrices. When steering a signal using the implicit calibration beamformer computed steering matrix, the implicit beamformer may apply the transmitter side calibration matrix $K_{A,Tx}$ on the transmitted steered packets when multiplying the computer steering matrix with the signal stream, using the following expression (which is similar to Equ. 1):

$$y_B = H_{AB} K_{A,Tx} V_{steer} x_A + n_B, \quad \text{(Equ. 22)}$$

That is, Station A left-multiplies $K_{A,Tx}$ with the signal it is to transmit $(Q_A x_A)$ at baseband, where $Q_A$ is the steering matrix, $V_{steer}$ (which may be a vector) at Station A that spreads the signal vector onto actual transmitting chains at Station A at baseband. Optionally, Station A modifies the steering matrix $Q_A$ with the correction matrix by, for example, left-multiplying $K_{A,Tx}$ with $Q_A$.

Alternatively, Station A applies a receiver side calibration matrix on the reverse channel estimation, i.e., from CSI feedback packet 216, based on which the steering matrix is computed according to the following:

$$\hat{H}_{BA} = K_{A,Rx} \tilde{H}_{BA}, \quad \text{(Equ. 7)}$$

$$V_{steer} = f(\hat{H}_{BA}^T), \quad \text{(Equ. 23)}$$

Here, Station A left-multiplies $K_{A,Rx}$ with the signal it receives from Station B ($y_A = \tilde{H}_{BA} Q_B x_B + n_A$, where $y_A$ and $n_A$ are the received signal vector and additive noise vector at Station A, respectively; $\tilde{H}_{BA}$ is the equivalent channel from Station B to Station A; $x_B$ is the signal vector to be transmitted from Station B; and $Q_B$ is the steering matrix (which may be a vector) at Station B that spreads the signal vector onto actual transmitting chains at Station B at baseband).

In either case, multiplication of the correction matrix, whether performed in software or hardware, is performed in the frequency domain, for example, multiplying at each OFDM sub-carrier in the frequency domain, in the time domain, or in a combination of both.

Figure 7:
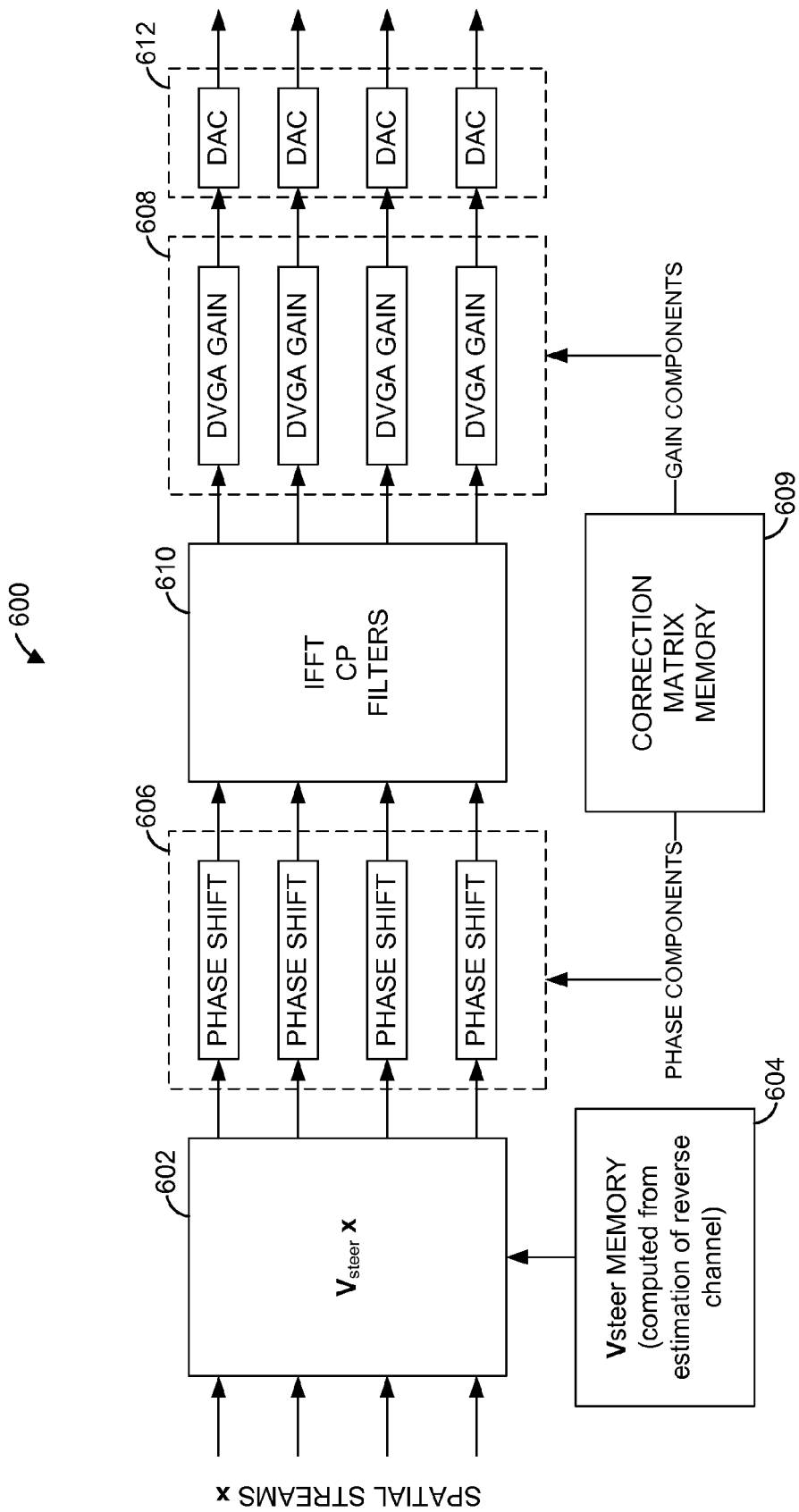
FIG. 7 is a block diagram of an example implementation of a space time mapping controller of FIG. 1.

FIG. 7 illustrates an example configuration 600 of the space-time mapping blocks 24 and/or 34 of FIG. 1, which apply the determined correction matrix to the forward and/or reverse channels accordingly. The spatial streams, x, are provided to a beamsteering matrix controller 602, which applies the computed steering matrix, $V_{steer}$, computed as discussed above and stored in a memory 604. When compensating only the phase differences among the antennas on the Station A, the controller 602 provides parallel output signals to a phase correction stage 606, which then applies different phase shifts for each output signal, as determined by the stored correction matrix ($K_{A,Tx}$) 609, e.g., by only using the phase components unless the correction matrix is only expressed in terms of phase. The stage 606 may be implemented by different phase shifter stages 602a-602d (not individually labeled), one for each transmitter chain (antenna).

In the illustrated example, correction of the phase shift is determined in the frequency domain. The correction occurs at the transmitter of Station A, as shown, or in other examples, at the receiver of Station B. At the transmitter side, the correction is performed on each sub-carrier at each transmitter chain, corresponding to each antenna, after the beamsteering matrix, $V_{steer}$, has been applied to the signal stream, x.

In some examples, Station A also compensates for gain mismatches, by using a gain correction stage 608 implemented, for example, using a digital variable gain amplifier (DVGA). The stage is implemented by different DVGA gain stages 608a-608d (not individually labeled), one for each transmit antenna, in the illustrated example. The gain correction stage applies digital gain with correction values, from the correction matrix, $K_{A,Tx}$, to each transmitter chain, where the corresponding matrix multiplication may be done in the time domain. In the illustrated example, an inverse fast Fourier transform (IFFT) controller 610 converts the phase corrected signal of stage 606 from the frequency domain to the time domain for the gain correction stage 608. A corresponding DAC converter stage 612 provides the corrected signal stream to the corresponding antennas of Station A.

In some configurations, a MIMO-OFDM transmitter applies time domain cyclic delay diversity (TCDD) after the IFFT and CP insertion of block 610 on the transmitter chains. In some calibration procedures, the Station A turns OFF the TCDD function whenever sending a calibration initiation (e.g. sounding) packet and whenever Station A transmits the steered data packets determined using an implicit beamforming technique. If Station A does not turn OFF TCDD, then in other examples Station A manually applies the TCDD effects (i.e., linear phase shifts across sub-carriers) in the frequency domain of the channel estimations on the packets of the reverse channel.

Figure 8:
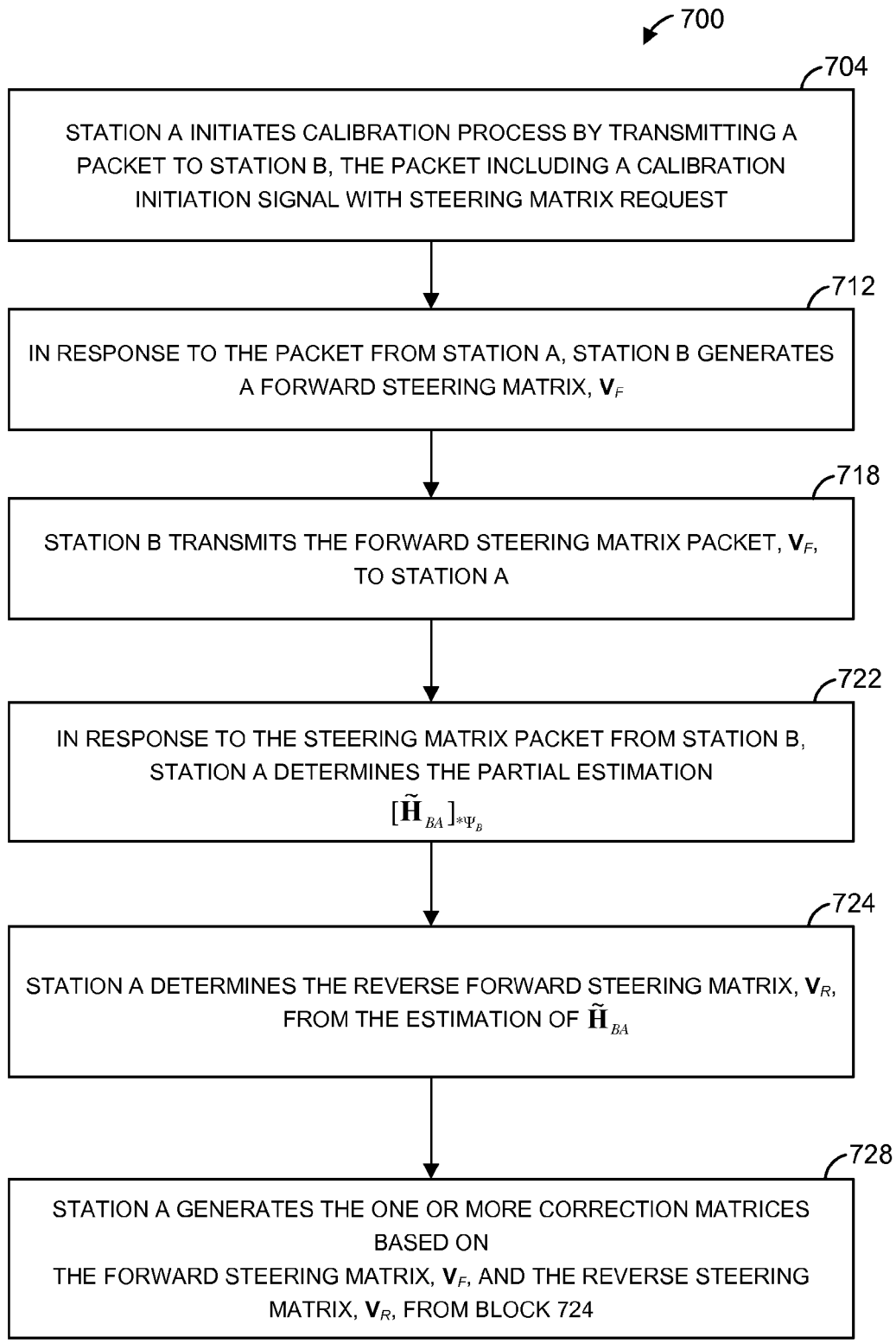
FIG. 8 is a flow diagram of another example method for calibrating a station in a wireless network.

FIG. 8 illustrates another method 700 for calibration of communications between Station A and Station B. The method 700 is described in reference to the timing diagram illustrated in FIG. 9. At a block 704, Station A initiates a calibration process by sending a packet 708 to Station B. The packet 708, like the packet 208, may include a "calibration initiation" signal, which indicates to Station B that Station A is requesting to initialize calibration. For the method 700, the packet 708 requests that Station B send a steering matrix as the feedback signal, whereas in the method 200, the packet 208, requested a CSI feedback signal. The calibration initiation signal may be sent at a physical layer or a media access control layer, for example, of a wireless communication protocol. The packet 708 may be a sounding packet, for example.

At a block 712, in response to receiving the packet 708, Station B generates a forward steering matrix, $V_F$, which Station B transmits to Station A via a steering matrix feedback packet 716 at block 718. The transmission of the steering matrix feedback packet 716 is generally not considered time critical.

In response to the steering matrix feedback packet 716, block 722 determines the partial estimation of the reverse channel based on the received forward steering matrix, $V_F$, determined by Station B at the block 712. To determine the reverse channel in this manner, Station A may be configured with the same information Station B uses to determine $V_F$. For example, Station A and Station B may be both designed with the same steering matrix determination schemes. With the determination at the block 722, after receipt of the pack 716, Station A will have information on both the forward link, $V_F$, and the reverse link, from which a correction matrix $K_{A,Tx}$ can be determined.

If Station B only uses a portion of its antennas to send $V_F$, block 722 will determine the partial estimation of the reverse channel $[\tilde{H}_{BA}]*_{\Psi_B}$.

With the estimate of the reverse channel, or $[\tilde{H}_{AB}]*_{\Psi_B}$, a block 724 determines the reverse steering matrix, $V_R$, for example applying Equation 17:

$$V_R = f([\tilde{H}_{BA}^T]*_{\Psi_B}),\qquad \text{(Equ. 17)}$$

A block 728 then determines the correction matrix based on the determined forward and backward steering matrices, according to Equation 18:

$$K_{A,Tx} = V_F V_R^H,\qquad \text{(Equ. 18)}$$

For even more accurate results, in some examples, the block 728 averages the matrix values over multiple OFDM subcarriers. Furthermore, as mentioned above, Station A determines the forward steering matrix using the same function, $f$, that Station B uses in determining the forward steering matrix. Further still, in some examples, Station B uses an identity matrix when determining the forward steering matrix, which simplifies the determination of the reverse steering matrix at Station A.

Figure 9:
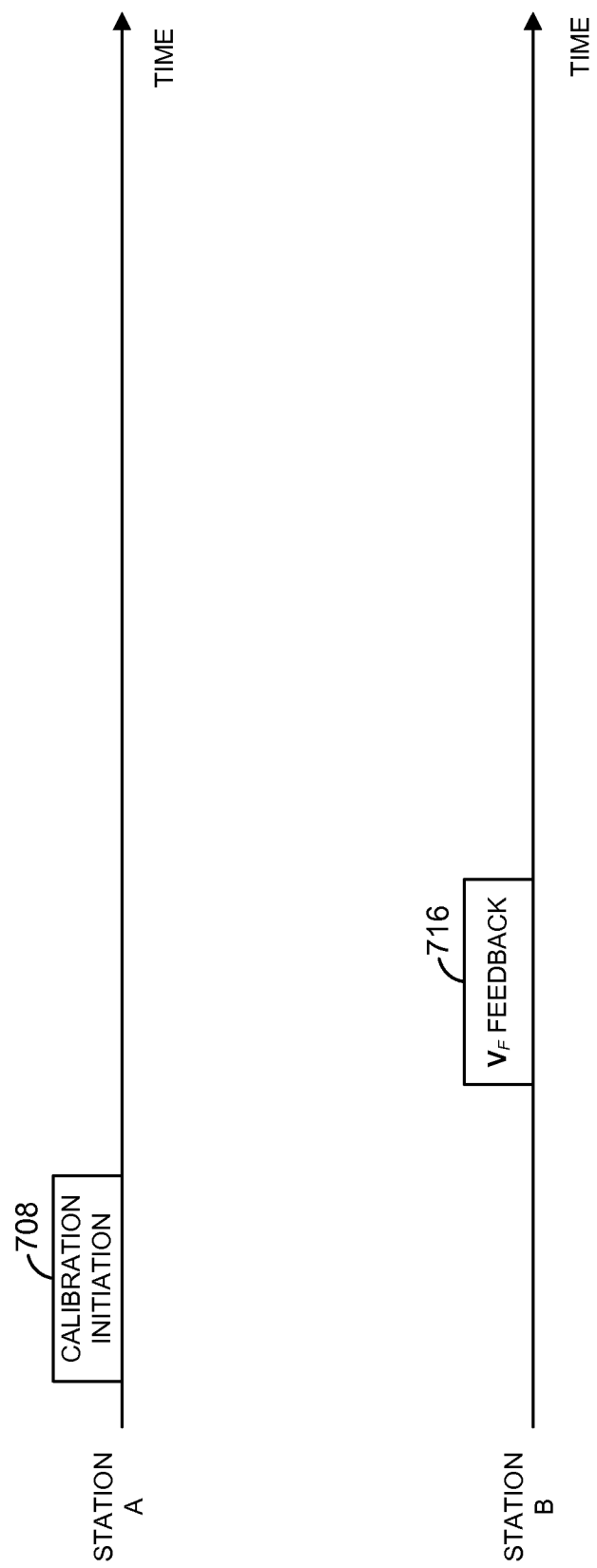
FIG. 9 is a timing diagram illustrating communications between a Station A and a Station B during the calibration method of FIG. 8.

The method 700 of FIG. 9 is implemented by the system 10 of FIG. 1. Of course, in other examples, the method 700 is implemented by other systems. Further, in other examples, the system 10 implements a method other than method 700.

For example, the controller 20 causes the sounding packet 708 to be sent to the receiver 16 (block 704). The controller 40 causes the steering matrix feedback packet 716 to be sent to the transmitter 12 (block 718). Steering matrix calculation unit 48 generates the forward steering matrix, $V_F$, (block 712), and the controller 40 causes this information to be sent back to the transmitter (block 718). The correction matrix calculation unit 29 generates $[\tilde{H}_{BA}]*_{\Psi_B}$ (block 722). The steering matrix calculation unit 28 generates the reverse steering matrix, $V_R$, (block 724). The correction matrix calculation unit 29 also generates the one or more correction matrices (block 728).

After initialization, to send a data packet, the space-time mapping block 24 left-multiplies the correction matrix $K_{A,Tx}$ with the signal to be transmitted at baseband. In other examples, the steering matrix calculation block 28 modifies the steering matrix $Q_A$ using the correction matrix $K_{A,Tx}$ by, for example, left-multiplying the correction matrix $K_{A,Tx}$ with the steering matrix $Q_A$ to generate a modified steering matrix. In yet other examples, the correction matrix calculation unit 29 modifies the steering matrix $Q_A$ using the correction matrix $K_{A,Tx}$. Also, the matrix equalizer 25 left-multiplies the correction matrix $K_{A,Rx}$ with the signal it receives from the station 16 at baseband.

Figure 10:
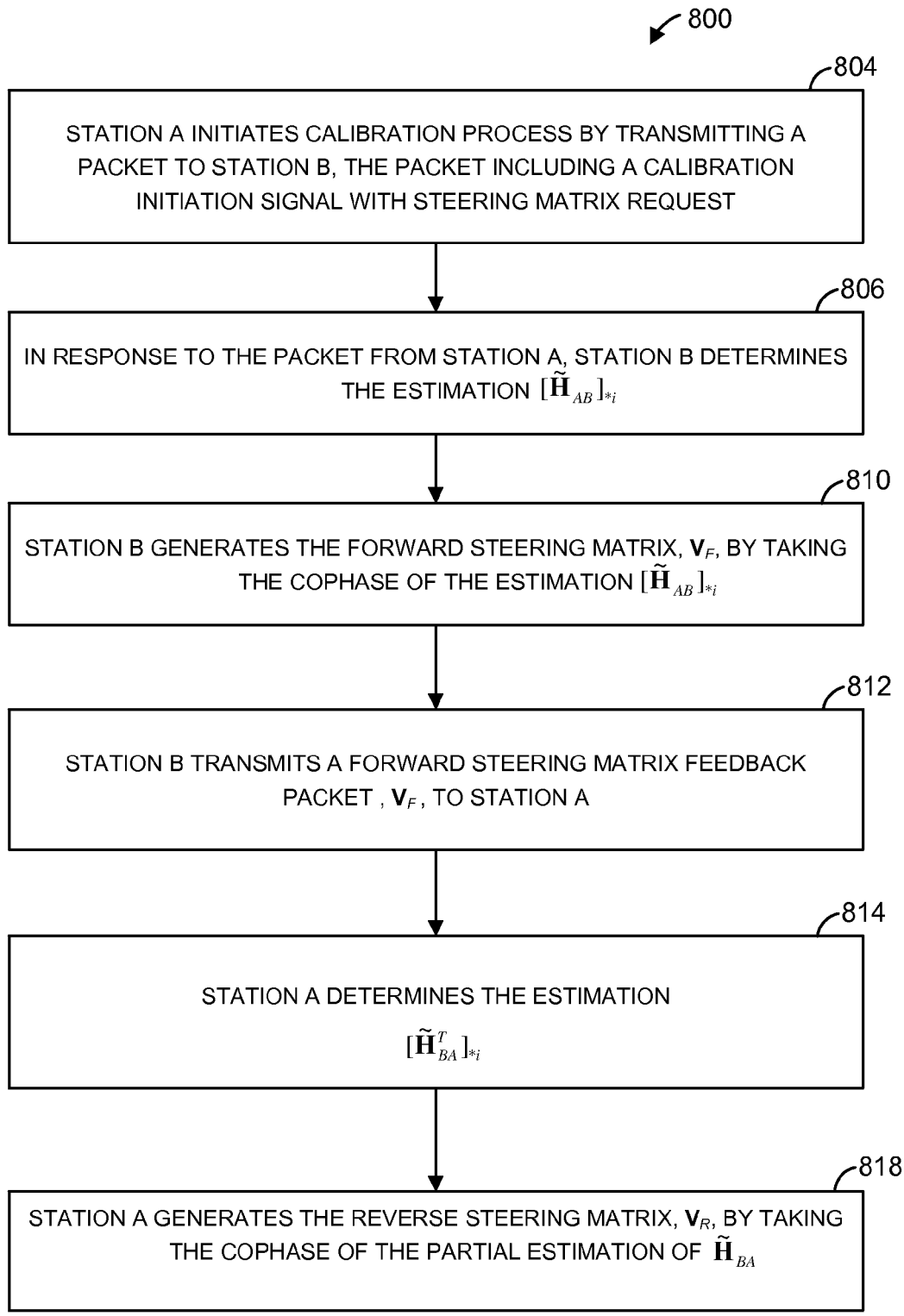
FIG. 10 is a flow diagram of an alternative example method to that of FIG. 8.

In some examples, Station B uses a single antenna to compute the forward steering matrix, for example using a cophasing technique. Station A, then, may then use a method 800, similar to that of method 500, and shown in FIG. 10, when Station B is using a single antenna. The feedback packet 716 is always spatially mapped by a 1×1 identity matrix, because there is one transmitted stream from only one antenna at Station B.

At block 804, Station A sends the calibration initiation packet 708 using a single antenna of Station A. At block 806, Station B (uses 1 receive antenna) determines an estimate of the 1-by-$N_{TX}$ forward channel $[\tilde{H}_{AB}]_{*i}$ based on packet 716. In response, at block 810, Station B performs a cophasing on the estimate of the 1-by-$N_{TX}$ forward channel $[\tilde{H}_{AB}]_{*i}$ to determine the forward steering matrix according to: #

$$V_F = cophase([\tilde{H}_{AB}]_{*i}) = \qquad \text{(Equ. 20)}$$

$$cophase([h_{i1}^{(F)} h_{i2}^{(F)} \ldots h_{iN_{Tx}}^{(F)}]) = \begin{bmatrix} e^{j\theta_{N_{Tx}1}} \\ e^{j\theta_{N_{Tx}2}} \\ \vdots \\ 1 \end{bmatrix},$$

At block 812, Station B sends the forward steering matrix to Station A, which then determines an estimate of the reverse channel $[\tilde{H}_{BA}^T]_{*i}$ at block 814 before determining the reverse steering matrix at block 818 according to: #

$$V_R = cophase([\tilde{H}_{BA}^T]_{*i}) = \qquad \text{(Equ. 21)}$$

$$cophase([h_{i1}^{(R)} h_{i2}^{(R)} \ldots h_{iN_{Tx}}^{(R)}]) = \begin{bmatrix} e^{j\Psi_{N_{Tx}1}} \\ e^{j\Psi_{N_{Tx}2}} \\ \vdots \\ 1 \end{bmatrix}.$$

Station A then returns control to block 728 for determining the correction matrix $K_{A,Tx}$.

While the foregoing describes the determination of example correction factors and matrices, in other examples, other correction factors or matrices that compensate for the effects of RF chain impairments and other non-equalities that prevent the partial estimation of the forward channel $[\tilde{H}_{AB}]_{*\Psi_B}$ from equaling or being the same as the partial estimation of the reverse channel $[\tilde{H}_{BA}^T]_{*\Psi_B}$ developed from the reverse channel $\tilde{H}_{BA}$ may be determined. These other correction factors or matrices would then be used instead of the correction matrices specifically detailed herein.

Figure 11:
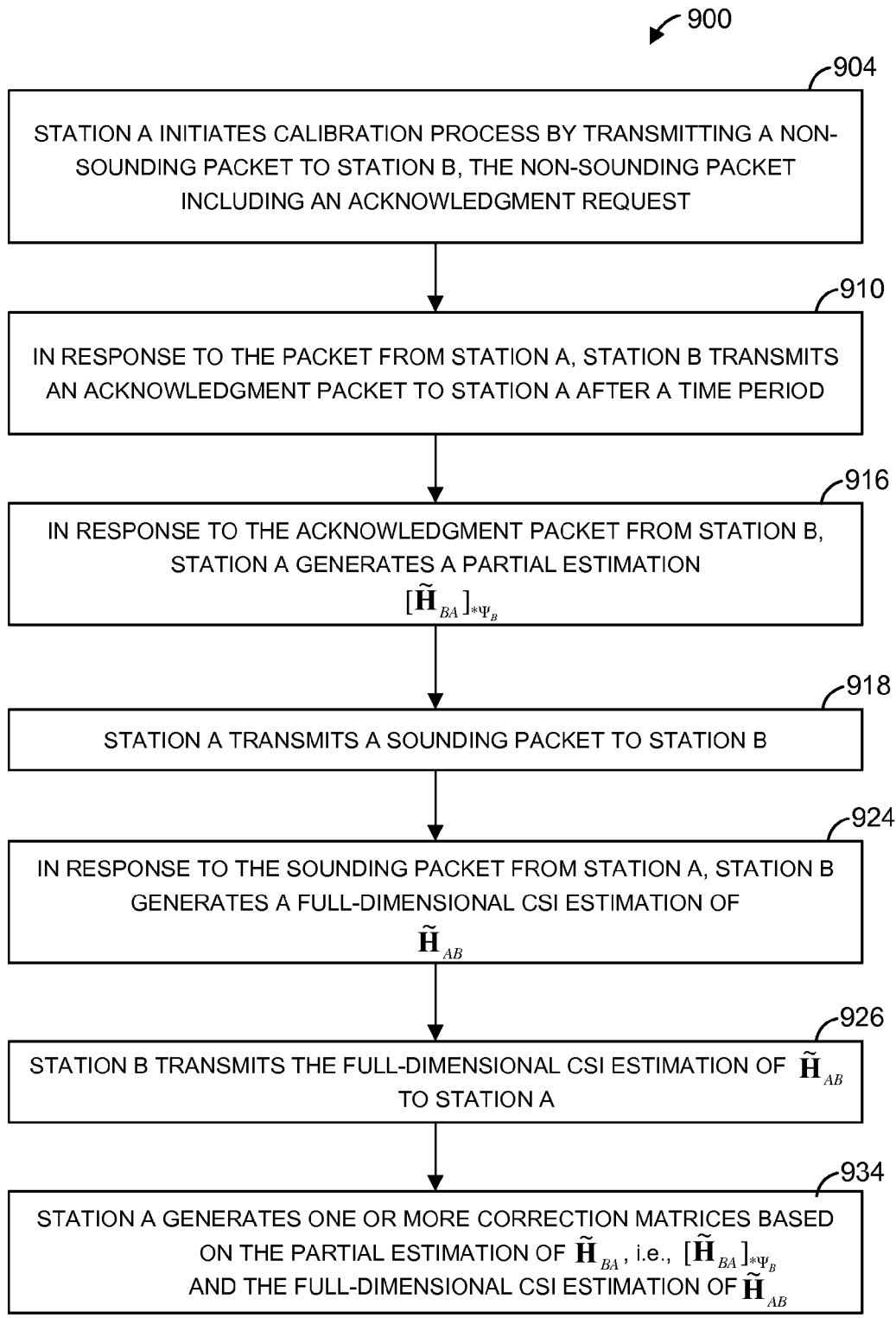
FIG. 11 is a flow diagram of another example method for calibrating a station in a wireless network.

FIG. 11 is a flow diagram of another example method 900 for calibrating a station in a wireless network. The method 900 will be described with reference to FIG. 12, which is a timing diagram illustrating communications between a Station A and a Station B during the calibration method 900. At a block 904, Station A initiates a calibration process by sending a packet 908 to Station B. The packet 908 sent at the block 254 may include a "calibration initiation" signal, which indicates to Station B that Station A is requesting to initialize calibration. The calibration initiation signal may be sent at a physical layer or a media access control layer, for example, of a wireless communication protocol. More specifically, the packet 908 includes an acknowledgement request. The packet 908 is not a sounding packet. In other words, the packet 908 is a non-sounding packet.

At a block 910, in response to receiving the packet 908 with the calibration initiation signal, Station B transmits an acknowledgment packet 912 after a time period Δt. The acknowledgment packet 912 may be a non-sounding packet.

At a block 916, in response to receiving the acknowledgment packet 912, Station A generates an estimate of a potentially partial portion of the reverse channel $\tilde{H}_{BA}$ based on the reception of the acknowledgment packet 912.

At a block 918, Station A generates and transmits a sounding packet 922 to Station B. The packet 922 is a sounding packet because it includes training information for all available spatial dimensions of a multiple-antenna channel.

At a block 924, in response to receiving the sounding packet 922 with the calibration initiation signal, Station B generates a full-dimensional CSI estimation of $\tilde{H}_{AB}$. At a block 926, Station B transmits the full-dimensional CSI estimation of $\tilde{H}_{AB}$ back to Station A via a CSI feedback packet 932. According to many wireless network protocols, transmission of the CSI feedback packet 932 typically is not considered time critical.

At a block 934, after receiving the CSI feedback packet 932, Station A calculates the correction matrix $K_{A,Tx}$ using $[\tilde{H}_{BA}]_{*\Psi_B}$ (block 916) and the corresponding columns in $\tilde{H}_{AB}$ (block 924) denoted as $[\tilde{H}_{AB}]_{*\Psi_B}$. Also, Station A may additionally or alternatively calculate a correction matrix $K_{A,Rx}$.

Figure 12:
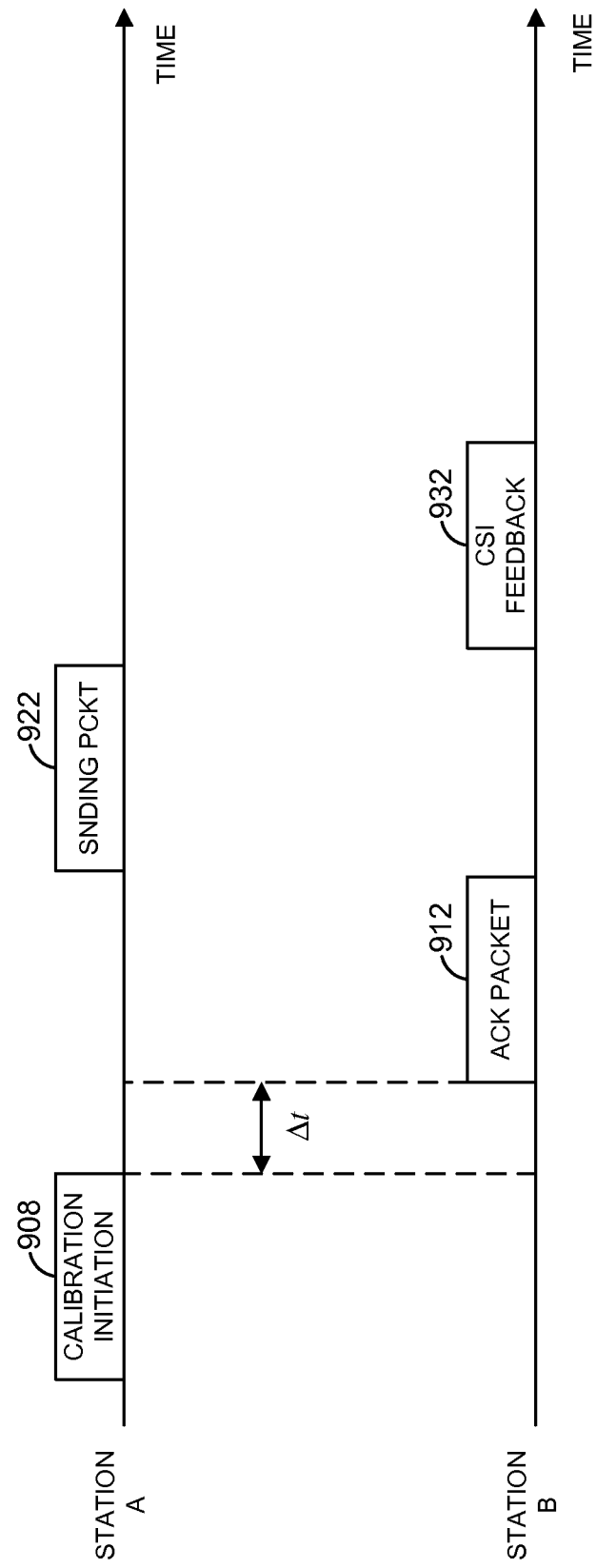
FIG. 12 is a timing diagram illustrating communications between a Station A and a Station B during the calibration method of FIG. 11.

Although in FIG. 12 it is shown that Station A transmits the sounding packet 922 after receiving the acknowledgment packet 912, it should be understood that, in other examples, Station A transmits the sounding packet 922 after receiving or during reception of the acknowledgment packet 912.

In some implementations of the method 900, Station A requests, via calibration initiation packet 908, that Station B send the ACK packet 912 using a modulation and coding scheme (MCS) with the same number of spatial streams as the number of antennas in Station A, for example using a link adaptation protocol or another protocol that can request the uplink packet. In implementations of the method 900, in which Station B uses only a single antenna, then such MCS matching is not used.

While the foregoing have been described from the perspective of the transmitter Station A, which is the beamformer station, the techniques may be applied to the receiver Station B, which is the beamformer station. An explicit receiver Station B may be configured to perform calibration by, for example, upon receiving a sounding packet from Station A, requesting a CSI feedback signal or steering matrix feedback signal from Station A. For example, upon receipt of the sounding packet, Station B may send a calibration initiation signal to Station A using a fixed MCS, where Station B forms the calibration initiation signal using the same number of spatial streams as the number of antennas used in the transmitter Station A, so that identity spatial mapping matrix may be used.

The implicit beamformer as transmitter Station A may be configured to perform calibration, by sending a sounding packet to the explicit beamformer receiver Station B, requesting either a CSI feedback signal or a steering matrix feedback signal. The Station A, upon receiving the feedback packet, may buffer the channel estimation for this packet, and then process both the feedback (i.e., the CSI feedback signal or the steering matrix) and the reverse link channel estimation upon receiving the feedback packet, $K_{B,Tx}$, to obtain the calibration coefficients.

While the above calibration processes are described, as having functions performed by one or the other of the transmitter and receiver stations, in other examples, each of the functions may be performed by both the transmitter and receiver. That is, in some examples, both an implicit beamforming Station A and an implicit beamforming Station B performs the methods described herein to establish a fully reciprocal communication between the two stations. In the later case, the implicit beamforming Station B acts as an explicit beamformer in calibrating itself, where Station B determines and applies its own correction matrix, whenever transmitting reverse channel packets to Station A.

The techniques described above are applicable, for example, in any single-carrier or multi-carrier (e.g., OFDM systems) systems that support data packet transceiving, and with multiple antennas at the transmitter. With a multi-carrier system, calibration processes and calculations such as described above may be conducted for each carrier. For example, in an OFDM system, calibration processes and calculations such as described above may be conducted for each sub-carrier.

After the correction matrix $K_{A,Tx}$ and/or the correction matrix $K_{A,Rx}$ are generated, these matrices may be stored in the memory 21 or in any other desired memory. The steering matrix calculation unit 28 is, thereafter, simply determining a new steering matrix using implicit beamforming, i.e., by determining an uncompensated or implicit steering matrix using any standard implicit beamforming technique, e.g., based on the assumption that an inferred channel (i.e., the estimate of the forward channel) $\tilde{H}_{BA}^T$ is equal to the actual forward channel $\tilde{H}_{AB}$, but then multiplying the uncompensated steering matrix by the correction matrix $K_{A,Tx}$ to create a compensated or corrected steering matrix that takes into account the errors introduced by RF chain impairments. As will be understood using this technique, once the correction matrix $K_{A,Tx}$ has been obtained for the forward channel between a particular transmitter/receiver pair, the transmitter can determine a new steering matrix for the forward channel at any time using implicit beamforming and the correction matrix $K_{A,Tx}$ (and thus relying only on signals transmitted from the receiver to the transmitter, i.e., in the reverse channel).

Figure 13:
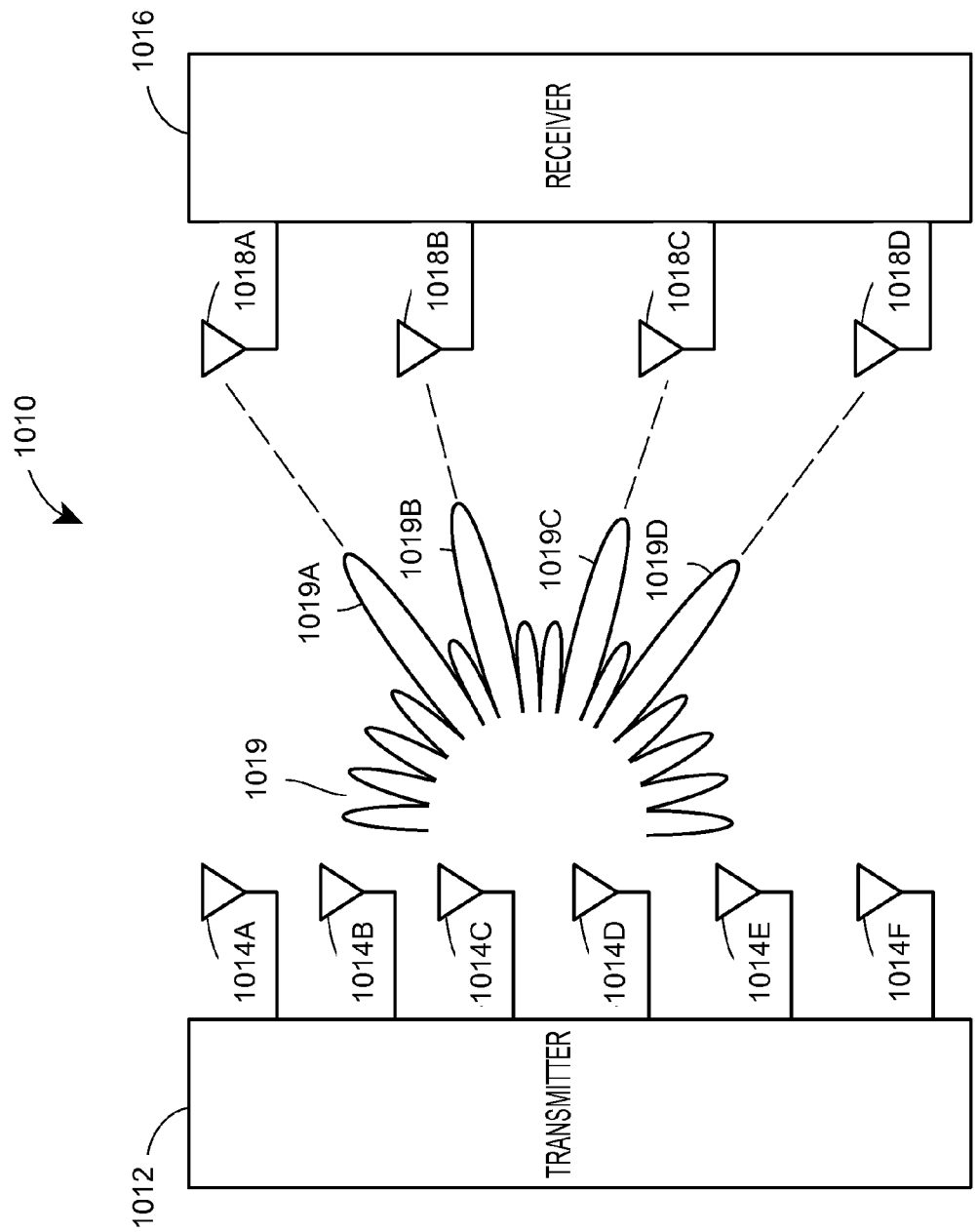
FIG. 13 is a block diagram illustrating a transmit gain pattern for wireless communications between a single transmitter and a single receiver implementing a transmitter beamforming technique that uses a calibration factor as part of an implicit beamforming technique.

To illustrate the techniques described herein, FIG. 13 shows a MIMO communication system 1010 having a single transmitter 1012 with six transmission antennas 1014A-1014F, and a single receiver 1016 with four receiver antennas 1018A-1018D. In this example, the steering matrix is developed by the transmitter 1012 using a corrected steering matrix developed in the manner described above to create a transmit gain pattern 1019 as shown disposed next to the transmitter 1012. As illustrated in FIG. 11, the transmit gain pattern 1019 includes multiple high gain lobes 1019A-1019D generally disposed in the directions of the receiver antennas 1018A-1018D. The high gain lobes 1019A-1019D are orientated in the directions of propagation from the transmitter 1012 to the particular receiver antennas 1018A-1018D while lower gain regions, which may even include one or more nulls, are produced in other directions of propagation. While FIG. 11 illustrates a separate high gain lobe directed to each of the receiver antennas 1018A-1018D, it will be understood that the actual gain pattern produced by the beam steering matrix calculations using implicit beamforming and a correction matrix may not necessarily include a separate high gain lobe for each of the receiver antennas 1018A-1018D. Instead, the gain pattern developed by the beam steering matrix for the transmitter 1012 may have a single high gain lobe covering or directed generally to more than one of the receiver antennas 1018A-1018D. Thus, it is to be understood that the beam pattern resulting from the creation of a steering matrix using implicit beamforming and a calibration factor may or may not have separate high gain lobes separated by low gain regions or nulls for each of the receiver antennas.

Of course, developing the beam pattern 1019 to have high gain regions and low gain regions based on a correction matrix may be performed in any desired manner and location. For example, any of the components within the receiver 16 of FIG. 1, including the controller 40, the steering matrix calculation unit 48 and the channel determination unit 39 determines the CSI or other measured description of the forward channel and, if desired determines the right singular matrixes for the forward channel from this information. The receiver 16 then sends any of this determined information to the transmitter 12. If desired, however, the receiver 16 simply collects the known signal received from the transmitter 12 and may send this signal back to the transmitter 12 without processing this signal in any significant manner, and the transmitter 12 then determines the measured description of the forward channel from this information. In either case, the controller 20 and/or the steering matrix calculation unit 28 and/or the correction matrix calculation unit 29 within the transmitter 12 uses the information determined about the forward channel and/or the reverse channel to calculate and apply the correction matrix in modifying the steering matrix and/or for use in the space-time mapping block 24 to thereby implement beamforming in the forward channel.

It will be understood that the correction matrix equations, e.g., the computation of the correction matrix, may be performed at any desired location within the wireless communication system 10 of FIG. 1, including within the controller 20 or other hardware, software, or firmware of the transmitter 12, as well as within the controller 40 or other hardware, software, or firmware of the receiver 16. In the later case, the receiver 16 computes at least some of the forward channel information to be used by the transmitter 12 based on the specifics of the forward channel determined at the receiver 16 and, if desired, the CSI developed by the receiver 16, and sends this information to the transmitter 12 to be used in calculating the correction matrix. On the other hand, the steering matrix for the transmitter space-time mapping block 24 of FIG. 1 is calculated by the steering matrix calculation unit 28 within the transmitter 12 based on raw channel data or signals sent by the receiver 16 provided and sent back from the receiver 16 to the transmitter 12, in other examples.

Of course, the beamforming technique described herein is not limited to being used in a transmitter of a MIMO communication system communicating with a single receiver of the MIMO communication system, but can additionally be applied when a transmitter of a MIMO communication system is communicating with multiple receivers, each of which has one or more receiver antennas associated therewith. In this case, the transmitter performs or implement a separate correction matrix calculation for each receiver to which the transmitter will transmit and may therefore develop a different steering matrix and/or correction matrix for each of the possible receivers, and uses those steering matrixes to beamform to the separate or different receivers at different times or using different channels, e.g., OFDM channels, of the system. Moreover, while the maximum gains of the high gain lobes of each of the transmit gain patterns illustrated in FIG. 11 are shown as being the same, the steering matrix calculation units 28 and 48 may develop steering matrixes which produce high gain lobes with differing maximum gains.

While the above techniques are described in reference to calibration and correction procedures that occur at the initiation of a transmitter and use one direction sounding to a receiver, these techniques may be extended into a bi-direction calibration procedure in which both transmitter and receiver each send sounding packets to one another and provide resulting feedback signals to one another. Using such a bi-directional calibration procedure, one or both of these communication devices may be capable of implicit beamforming, while both devices may also be capable of explicit beamforming. The bi-directional calibration procedure is able to provide either CSI or a steering matrix in both directions, that is, on the forward and the reverse channels. Moreover, the CSI or steering matrix may be provided as explicit feedback signals, thereby allowing both a transmitter and a receiver to perform phase correction based on an explicit feedback from the other of the receiver or transmitter.

Figure 14A:
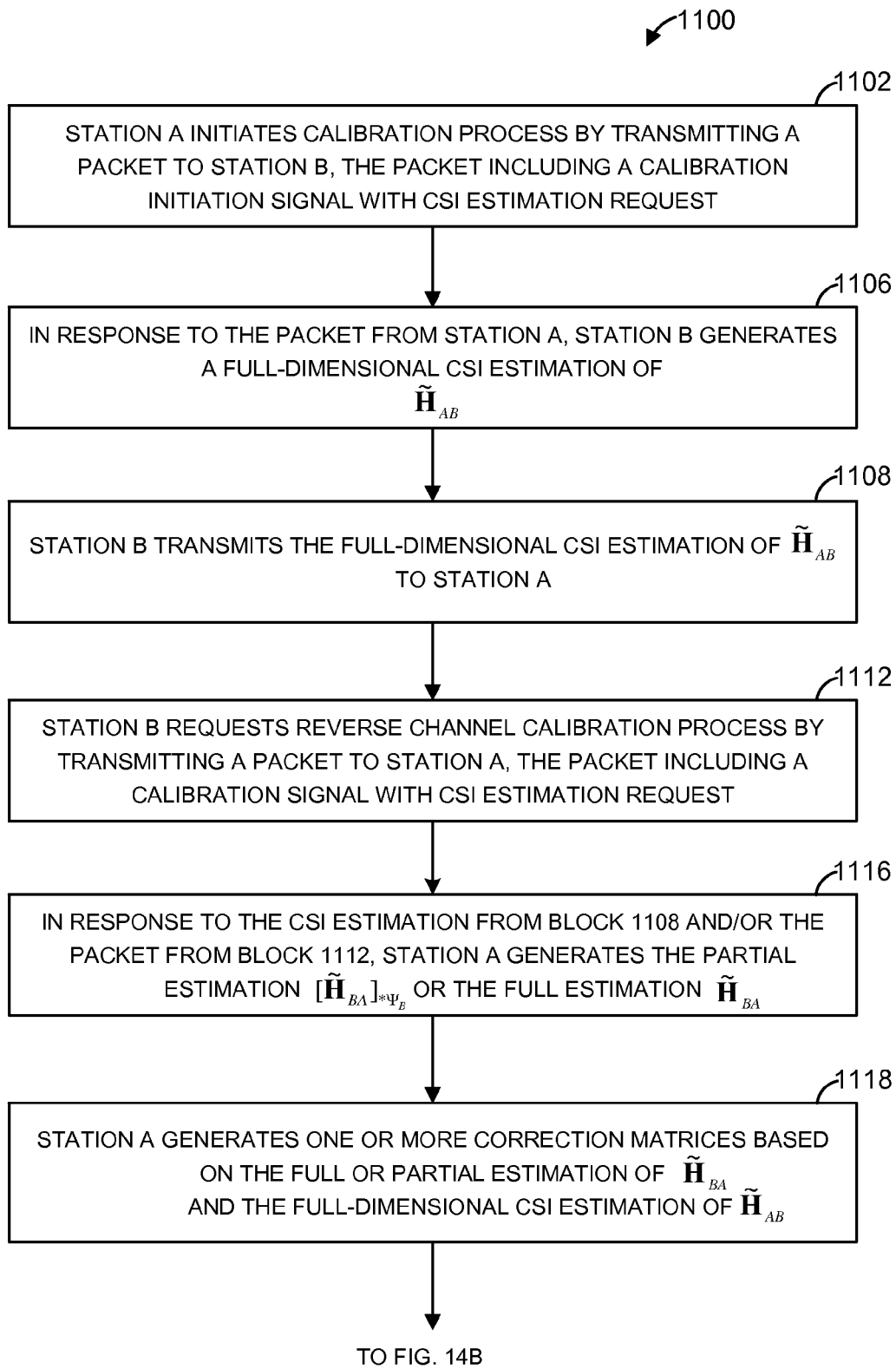
FIGS. 14A and 14B are a flow diagram of an example method for calibrating a station in a wireless network using bi-directional calibration.
Figure 14B:
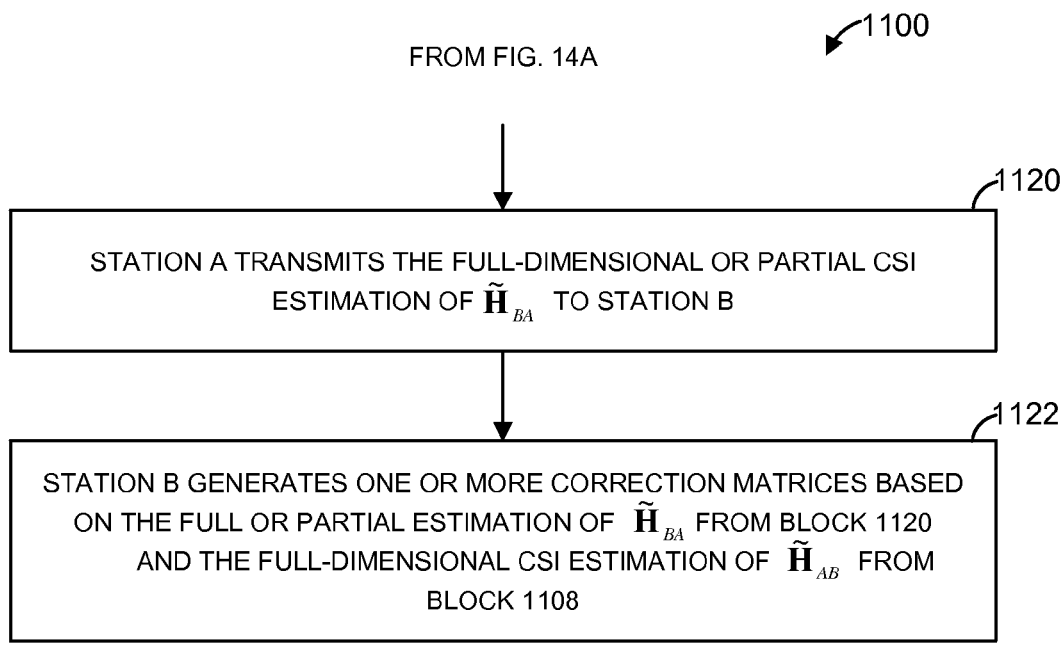
Figure 15:
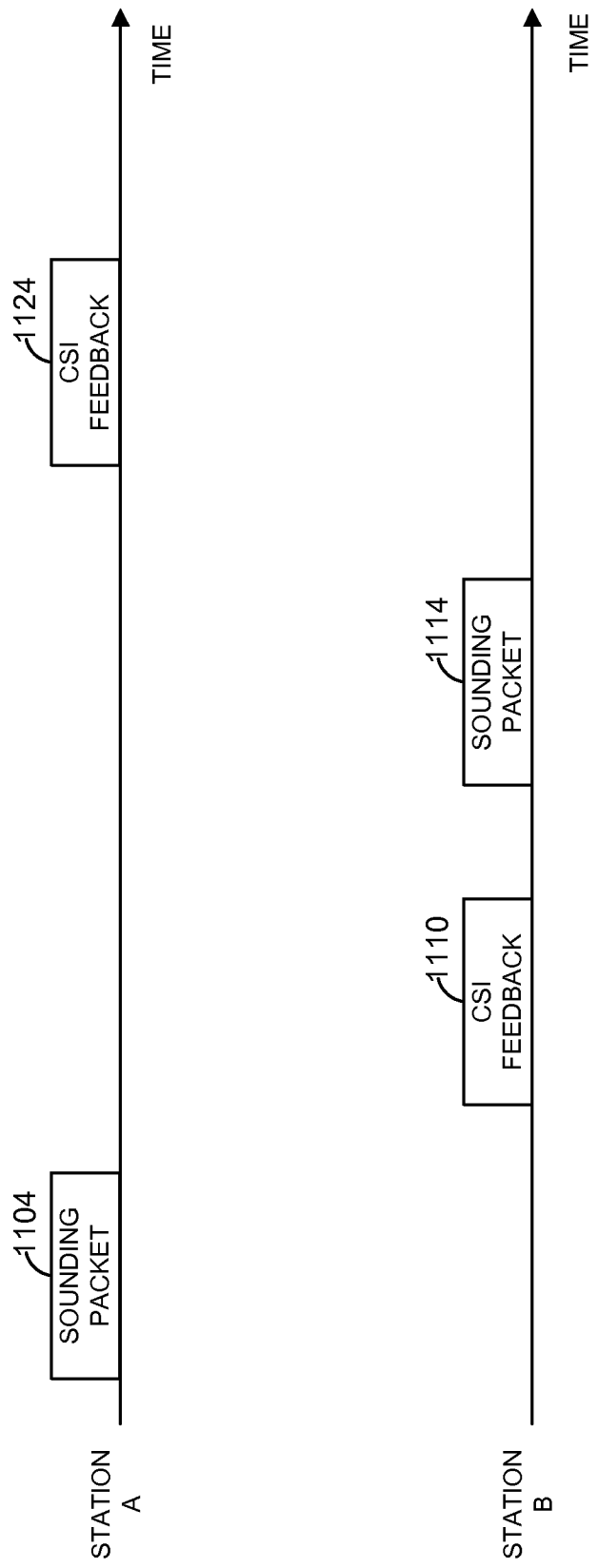
FIG. 15 is a timing diagram illustrating communications between a Station A and a Station B during the bi-directional calibration method of FIG. 14.

FIGS. 14A and 14B illustrate a flow diagram of an example method 1100 for bi-directional calibration of two stations in a wireless network, using an explicit beamforming technique. The method 1100 will be described with reference to FIG. 15, which is a timing diagram illustrating communications between a Station A and a Station B during the calibration method 1100. At a block 1102, Station A initiates a calibration process by sending a packet 1104 to Station B. The packet 1104 sent at the block 204 includes a "calibration initiation" signal, which indicates to Station B that Station A is requesting to initialize calibration. The calibration initiation signal may be sent at a physical layer or a media access control layer, for example, of a wireless communication protocol. The packet 1104 may be a sounding packet, for example.

At a block 1106, in response to receiving the packet 1104 with the calibration initiation signal, Station B generates a full-dimensional channel state information (CSI) estimation of $\tilde{H}_{AB}$. At a block 1108, after Station B generates the full-dimensional CSI estimation of $\tilde{H}_{AB}$ (block 1106), Station B transmits it back to Station A via a CSI feedback packet 1110.

Station B may generate the CSI as discussed above, for example, in reference to the example of FIG. 2. Furthermore, as discussed, Station B may use only a portion of its available antennas to send the CSI feedback packet 1110, e.g., using the same number of antennas as there are to be spatial streams in the CSI feedback packet 1110. In some examples, Station B will use the same data rate and bandwidth setting (e.g., as set forth in the 802.11n standard) as are in the calibration initial packet (e.g., sounding packet) 1104, when sending the CSI feedback packet 1110. The CSI feedback packet 1110 is a not a sounding packet because it does not include training information for all available spatial dimensions of a multiple-antenna channel. Rather, the CSI feedback packet 1110 includes one or more characteristics of $\tilde{H}_{AB}$, e.g., of each of the OFDM channels (for example, the gain, the phase and the SNR of each channel). Such a packet may be referred to as a non-sounding packet, although in the case where Station B uses a single receiver side antenna to transmit the reverse channel CSI feedback packet 1110, that packet essentially provides a full sounding of the antenna used.

At a block 1118, after receiving the CSI feedback packet 216, Station A calculates the correction matrix $K_{A,Tx}$. For example, at a block 1116, from the received CSI feedback packet 1110, Station A may determine a partial estimate of the reverse channel $[\tilde{H}_{BA}]_{*\Psi_B}$, where $\Psi_B$ indicates the subset of the antennas at Station B. In other examples, at the block 1116, Station A may determine a full-dimensional CSI estimation of $[\tilde{H}_{BA}]_{*\Psi_B}$.

In response to this estimation (block 1116) and the full-dimension CSI estimation (block 1108), the block 1118 calculates the correction matrix $K_{A,Tx}$. In other examples, Station A additionally or alternatively calculates a correction matrix $K_{A,Rx}$, e.g., at the block 1118. As shown, even if Station B uses only a subset of its antennas in sending the CSI feedback packet 1110, Station A is able to determine the correction matrix, $K_{A,Tx}$.

In the bi-directional calibration method 1100, at a block 1112, Station B generates and sends a packet 1114 on the reverse channel, which includes a "calibration" signal that indicates to Station A that Station B is requesting calibration on the reverse channel. As with the calibration initiation signal, this calibration signal may be sent at a physical layer or a media access control layer, for example, of a wireless communication protocol. The packet 1114 may be a sounding packet, for example. The Station B may send the packet 1114 in response to a request within the packet 1104 or the Station B may send the packet 1114 to initiate bi-directional calibration. That is, either Station A or Station B may initiate bi-directional calibration.

At a block 1120, Station A transmits the full-dimensional CSI estimation of $\tilde{H}_{BA}$ or the partial estimation of $[\tilde{H}_{BA}]_{*\Psi_B}$ to the Station A via a CSI feedback packet 1124.

At a block 1122, after receiving the CSI feedback packet 1124, Station B calculates the correction matrix $K_{B,Rx}$. In other examples, Station B additionally or alternatively calculates a correction matrix $K_{B,Tx}$, e.g., at the block 1128. In any event, the correction matrices $K_{B,Tx}$ and $K_{B,Rx}$ may be calculated using techniques described hereinabove.

In some examples, the method 1100 is implemented by the system 10 of FIG. 1. Of course, in other examples, the method 1100 is implemented by other systems.

In an example, the controller 20 causes the packet 1104 to be sent to the receiver 16 (block 1102). The controller 40 causes the CSI feedback packet 1110 to be sent to the transmitter 12 (block 1108). The channel determination unit 39 generates the full-dimensional CSI estimation of $\tilde{H}_{AB}$ (block 1106), and the controller 40 causes this information to be sent back to the transmitter 12 (block 1108).

To achieve the bi-directional calibration, the controller 40 causes the sounding packet 1114 to be sent to the transmitter 12 (block 1112).

The correction matrix calculation unit 29 may generate a partial estimation of $\tilde{H}_{BA}$, i.e., $[\tilde{H}_{BA}]_{*\Psi_B}$ based on the full-dimensional CSI estimation of $\tilde{H}_{AB}$ or the unit may generate the full estimation of $\tilde{H}_{BA}$ using the sounding packet (block 1116). The correction matrix calculation unit 29 also generates the one or more correction matrices, $K_{A,Rx}$ and/or $K_{A,Tx}$, (block 1118).

To transmit a signal from the transmitter 12, for example, the space-time mapping block 24 left-multiplies the correction matrix $K_{A,Tx}$ with the signal to be transmitted at baseband. Optionally, the steering matrix calculation block 28 modifies the steering matrix $Q_A$ using the correction matrix $K_{A,Tx}$ by, for example, left-multiplying the correction matrix $K_{A,Tx}$ with the steering matrix $Q_A$ to generate a modified steering matrix. Alternatively, the correction matrix calculation unit 29 modifies the steering matrix $Q_A$ using the correction matrix $K_{A,Tx}$. In other examples, the matrix equalizer 25 left-multiplies the correction matrix $K_{A,Rx}$ with the signal it receives from the station 16 at baseband.

The controller 20 causes the CSI feedback packet 1124, containing a full or partial estimation of $\tilde{H}_{BA}$ to be sent to the receiver 16 (block 1120). The channel determination unit 27 generates the full-dimensional or partial estimation of $\tilde{H}_{BA}$ (block 1116), and the controller 20 causes this information to be sent to the receiver 16 (block 1120). A correction matrix calculation unit 1129 generates one or more correction matrices $K_{B,Rx}$ and/or $K_{B,Tx}$ from the received estimation of $\tilde{H}_{BA}$ and the full estimation $\tilde{H}_{AB}$ (block 1128).

To transmit a signal from the receiver 16, for example, the space-time mapping block 34 left-multiplies the correction matrix $K_{B,Rx}$ with the signal to be transmitted at baseband. Optionally, the steering matrix calculation block 48 modifies the steering matrix $Q_B$ using the correction matrix $K_{B,Rx}$ by, for example, left-multiplying the correction matrix $K_{B,Rx}$ with the steering matrix $Q_B$ to generate a modified steering matrix. Alternatively, the correction matrix calculation unit 1129 modifies the steering matrix $Q_B$ using the correction matrix $K_{B,Rx}$. In other examples, the matrix equalizer 35 left-multiplies the correction matrix $K_{B,Tx}$ with the signal it receives from the station 12 at baseband.

While, in the method 1100, blocks 1112 and 1120-1128 corresponding to reverse channel calibration are described as performed in a particular order in relation to the forward channel, it will be appreciated that the operations of the method 1100 may be implemented in any particular order.

Figure 16A:
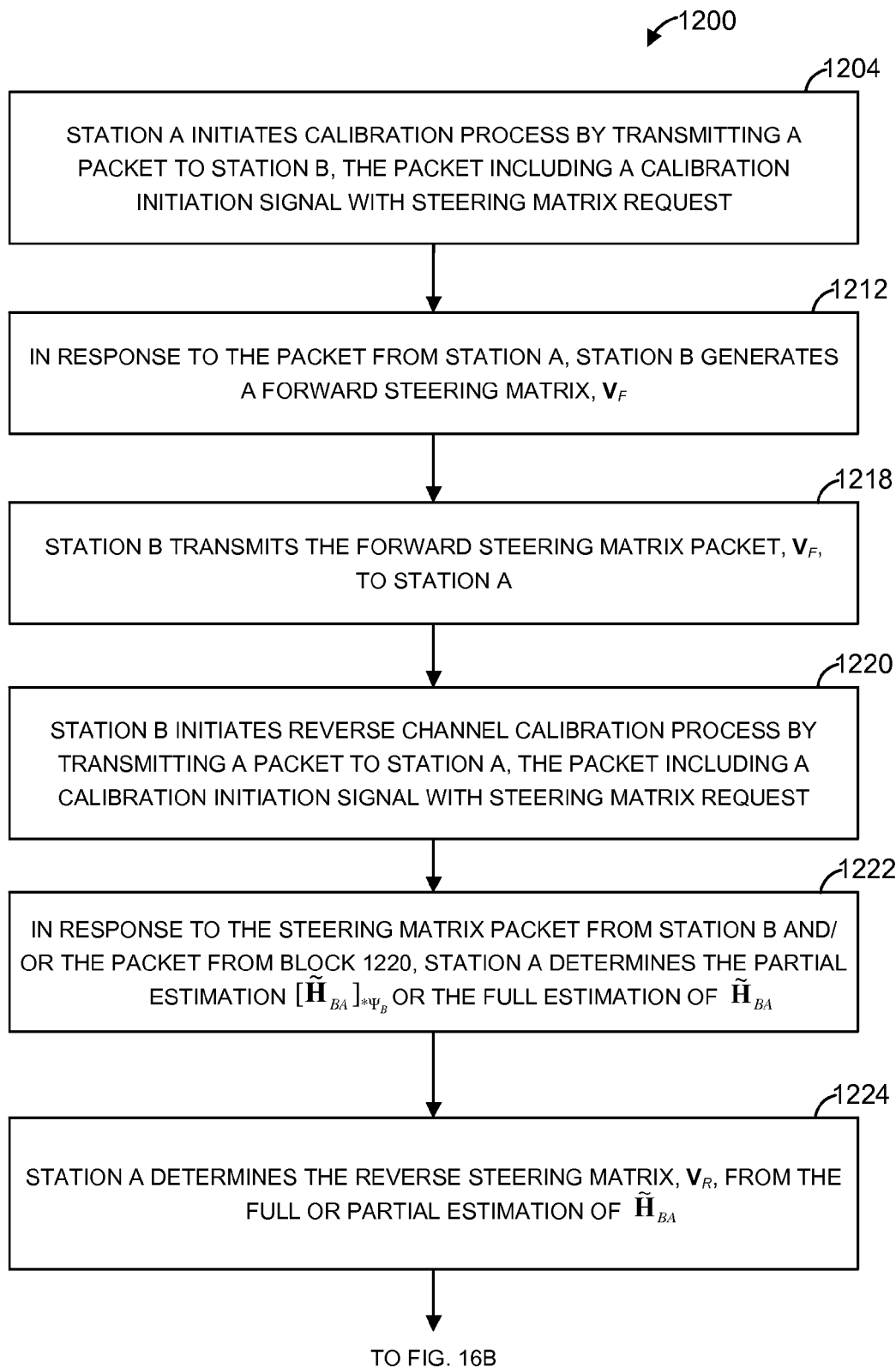
FIGS. 16A and 16B are a flow diagram of another example method for calibrating a station in a wireless network using a bi-directional calibration.
Figure 16B:
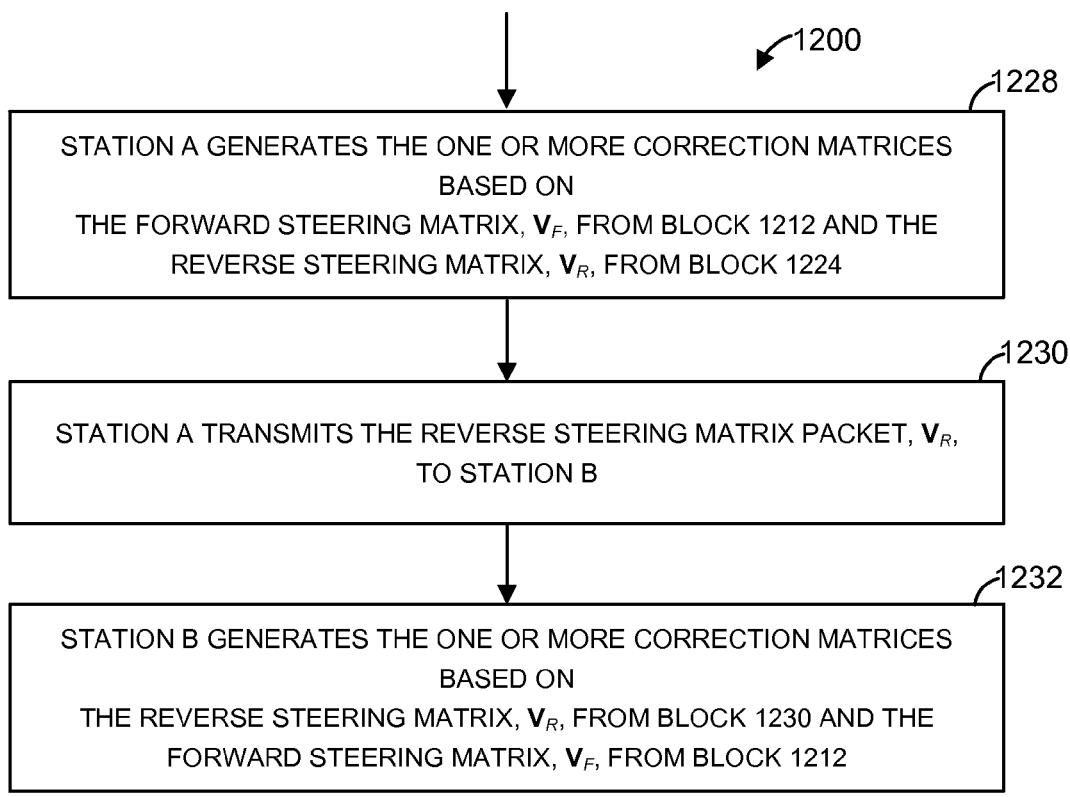

FIGS. 16A and 16B illustrate another method 1200 for bi-directional calibration of communications between Station A and Station B. The method 1200 is described in reference to the timing diagram illustrated in FIG. 17. At a block 1204, Station A initiates a calibration process by sending a packet 1208 to Station B. The packet 1208, like the packet 1104, may include a "calibration initiation" signal, which indicates to Station B that Station A is requesting to initialize calibration. For the method 1200, the packet 1208 requests that Station B send a steering matrix as the feedback signal, whereas in the method 1100, the packet 1104, requested a CSI feedback signal. The calibration initiation signal may be sent at a physical layer or a media access control layer, for example, of a wireless communication protocol. The packet 1208 may be a sounding packet, for example.

At a block 1212, in response to receiving the packet 1208, Station B generates a forward steering matrix, $V_F$, which Station B transmits to Station A via a steering matrix feedback packet 1216 at block 1218. The transmission of the steering matrix feedback packet 1216 is generally not considered time critical.

At a block 1220, Station B requests bi-directional calibration of the reverse channel by sending a packet 1221 to Station A. The packet 1221, like the packet 1208, may include a "calibration request" signal, which indicates to Station A that Station B is requesting to bi-directional calibration. In other examples, the bi-directional request may come from within the packet 1208. For the method 1200, the packet 1221 requests that Station A send a steering matrix as the feedback signal, whereas in the method 1100, the packet 1114, requested a CSI feedback signal. The calibration request signal may be sent at a physical layer or a media access control layer, for example, of a wireless communication protocol. The packet 1221 may be a sounding packet, for example.

In response to the steering matrix feedback packet 1216, block 1222 determines the full or partial estimation of the reverse channel $\tilde{H}_{BA}$ based on the received forward steering matrix, $V_F$, determined by Station B at the block 1212. To determine the reverse channel in this manner, Station A may be configured with the same information Station B uses to determine $V_F$. For example, Station A and Station B may be both designed with the same steering matrix determination schemes. With the determination at the block 1222, after receipt of the packet 1216, Station A will have information on both the forward link, $V_F$, and the reverse link, $V_R$, from which a correction matrix $K_{A,Tx}$ can be determined.

If Station B only uses a portion of its antennas to send $V_F$, block 1222 will determine the partial estimation of the reverse channel $[\tilde{H}_{BA}]*_{\Psi_B}$.

With the estimate of the reverse channel, full estimation of $\tilde{H}_{BA}$ or the partial estimation $[\tilde{H}_{AB}]*_{\Psi_B}$, a block 1224 determines the reverse steering matrix, $V_R$, for example applying Equation 17:

$$V_R = f([\tilde{H}_{BA}^T]*_{\Psi_B}), \quad \text{(Equ. 17)}$$

A block 1228 then determines the correction matrix based on the determined forward, $V_F$, and backward steering matrices, $V_R$, according to Equation 18:

$$K_{A,Tx} = V_F V_R^H, \quad \text{(Equ. 18)}$$

For even more accurate results, in some examples, the block 1228 averages the matrix values over multiple OFDM sub-carriers. Furthermore, as mentioned above, Station A determines the forward steering matrix using the same function, $f$, that Station B uses in determining the forward steering matrix. Further still, in some examples, Station B uses an identity matrix when determining the forward steering matrix, which simplifies the determination of the reverse steering matrix at Station A.

At a block 1230, Station A transmits the reverse steering matrix, $V_R$, to Station B via a steering matrix feedback packet 1232.

A block 1232 then determines the correction matrix based on the determined forward, $V_F$, and backward steering matrices, $V_R$, according to Equation 24:

$$K_{B,Rx} = V_R V_F^H, \quad \text{(Equ. 24)}$$

As with the block 1228, for even more accurate results, in some examples, the block 1240 averages the matrix values over multiple OFDM sub-carriers. Furthermore, as mentioned above, Station A determines the reverse steering matrix using the same function, $f$, that Station B uses in determining the forward steering matrix. Further still, in some examples, Station A uses an identity matrix when determining the reverse steering matrix, which simplifies the determination of the forward steering matrix at Station B.

The method 1200 of FIGS. 16A-16B is implemented by the system 10 of FIG. 1. In other examples, the method 1200 is implemented by other systems.

For example, the controller 20 causes the sounding packet 1208 to be sent to the receiver 16 (block 1204). The controller 40 causes the steering matrix feedback packet 1216 to be sent to the transmitter 12 (block 1218). To achieve the bi-directional calibration, the controller 40 causes the packet 1221 to be sent to the transmitter 12 (block 1220).

Steering matrix calculation unit 48 generates the forward steering matrix, $V_F$, (block 1212), and the controller 40 causes this information to be sent back to the transmitter 12 (block 1218). The correction matrix calculation unit 29 generates a full or partial estimation of $\tilde{H}_{BA}$ (block 1222), in response to the feedback 1216 and/or sounding packet 1221. The steering matrix calculation unit 28 generates the reverse steering matrix, $V_R$, (block 1224). The correction matrix calculation unit 29 also generates the one or more correction matrices (block 1228).

To transmit a signal from the transmitter 12, for example, the space-time mapping block 24 left-multiplies the correction matrix $K_{A,Tx}$ with the signal to be transmitted at baseband. Optionally, the steering matrix calculation block 28 modifies the steering matrix $Q_A$ using the correction matrix $K_{A,Tx}$ by, for example, left-multiplying the correction matrix $K_{A,Tx}$ with the steering matrix $Q_A$ to generate a modified steering matrix. Alternatively, the correction matrix calculation unit 29 modifies the steering matrix $Q_A$ using the correction matrix $K_{A,Tx}$. In other examples, the matrix equalizer 25 left-multiplies the correction matrix $K_{A,Rx}$ with the signal it receives from the station 16 at baseband.

The controller 20 causes the reverse steering matrix feedback packet 1232 to be sent to the receiver 16 (block 1230). The correction matrix calculation unit 1129 generates the one or more correction matrices (block 1232).

To transmit a signal from the receiver 16, for example, the space-time mapping block 34 left-multiplies the correction matrix $K_{B,Rx}$ with the signal to be transmitted at baseband. Optionally, the steering matrix calculation block 48 modifies the steering matrix $Q_B$ using the correction matrix $K_{B,Rx}$ by, for example, left-multiplying the correction matrix $K_{B,Rx}$ with the steering matrix $Q_B$ to generate a modified steering matrix. Alternatively, the correction matrix calculation unit 1129 modifies the steering matrix $Q_B$ using the correction matrix $K_{B,Rx}$. In other examples, the matrix equalizer 35 left-multiplies the correction matrix $K_{B,Tx}$ with the signal it receives from the station 12 at baseband.

While, in the method 1200, blocks 1220, 1230, and 1234-1240 corresponding to reverse channel calibration are described as performed in a particular order in relation to the forward channel, it will be appreciated that the operations of the method 1200 may be implemented in any particular order.

Figure 18:
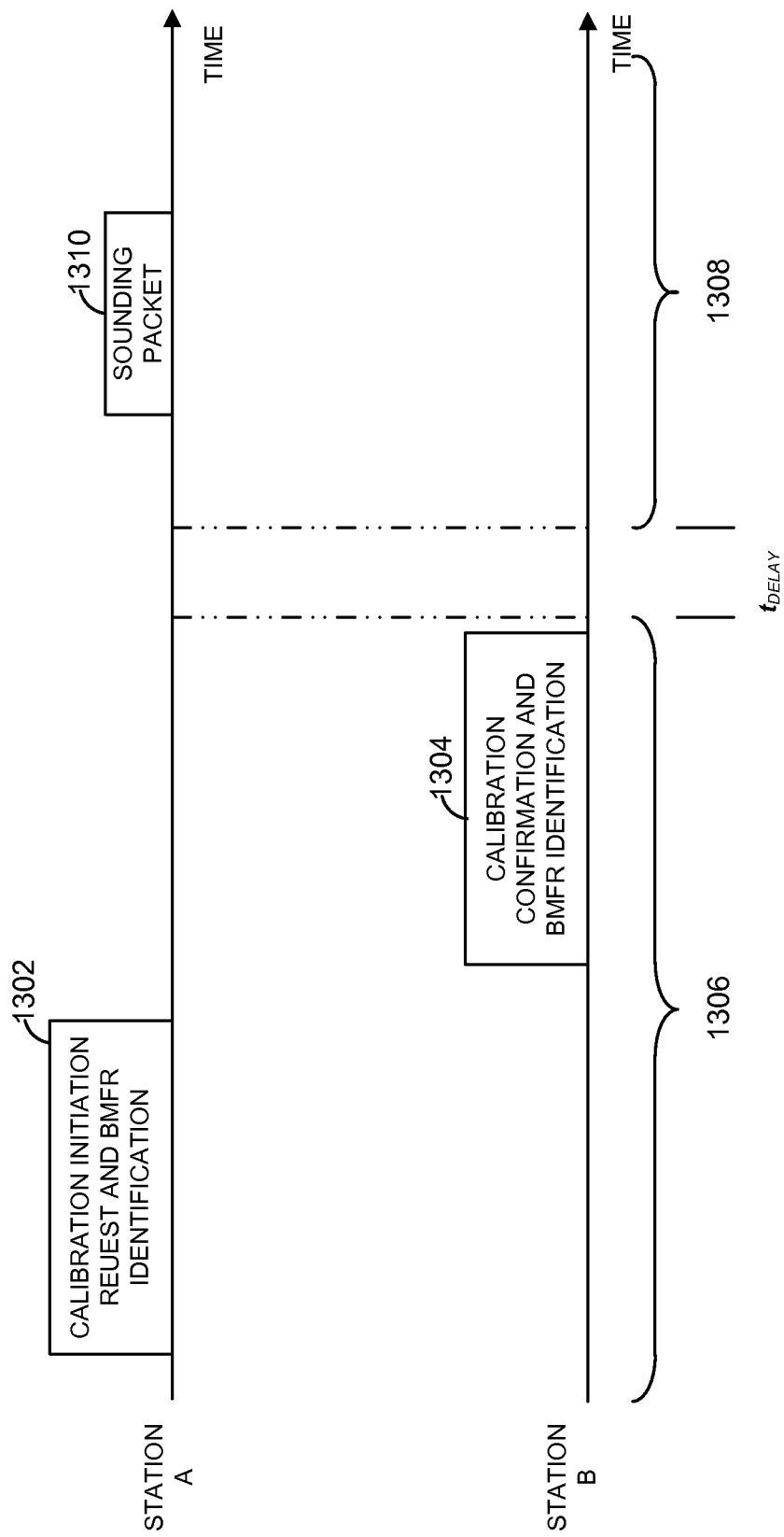
FIG. 18 is a timing diagram illustrating communications between a Station A and a Station B during an implicit beamformer identification interval before a bi-directional calibration.

To coordinate performing bi-directional calibration over a specific calibration interval, pre-calibration signaling may be performed between two devices. In FIG. 18, Station A and Station B perform a pre-calibration signaling to identify to each device that the other is an implicit beamformer. In the illustrated example, Station A sends a packet 1302 to Station B, where the packet 1302 includes "calibration initiation" signal that indicates to Station B that Station A is an implicit beamformer and that Station A requests to know whether Station B is also an implicit beamformer.

Station B replies to Station A with the feedback packet 1304 that includes a "calibration confirmation" signal that indicates to Station A that Station B is an implicit beamformer and that Station B is ready for implementing a bi-directional calibration method such as methods 1100 or 1200. This signaling occurs over identification interval 1306.

In some examples, either of the packets 1302 or 1304 may identify a time, such as a delay time, $t_{DELAY}$, after which a bi-directional calibration interval 1308 is to start. Either method 1100 or method 1200 may be initiated over the bi-directional calibration interval 1308 using a sounding packet or other calibration signal (1310) as described herein.

Figure 19:
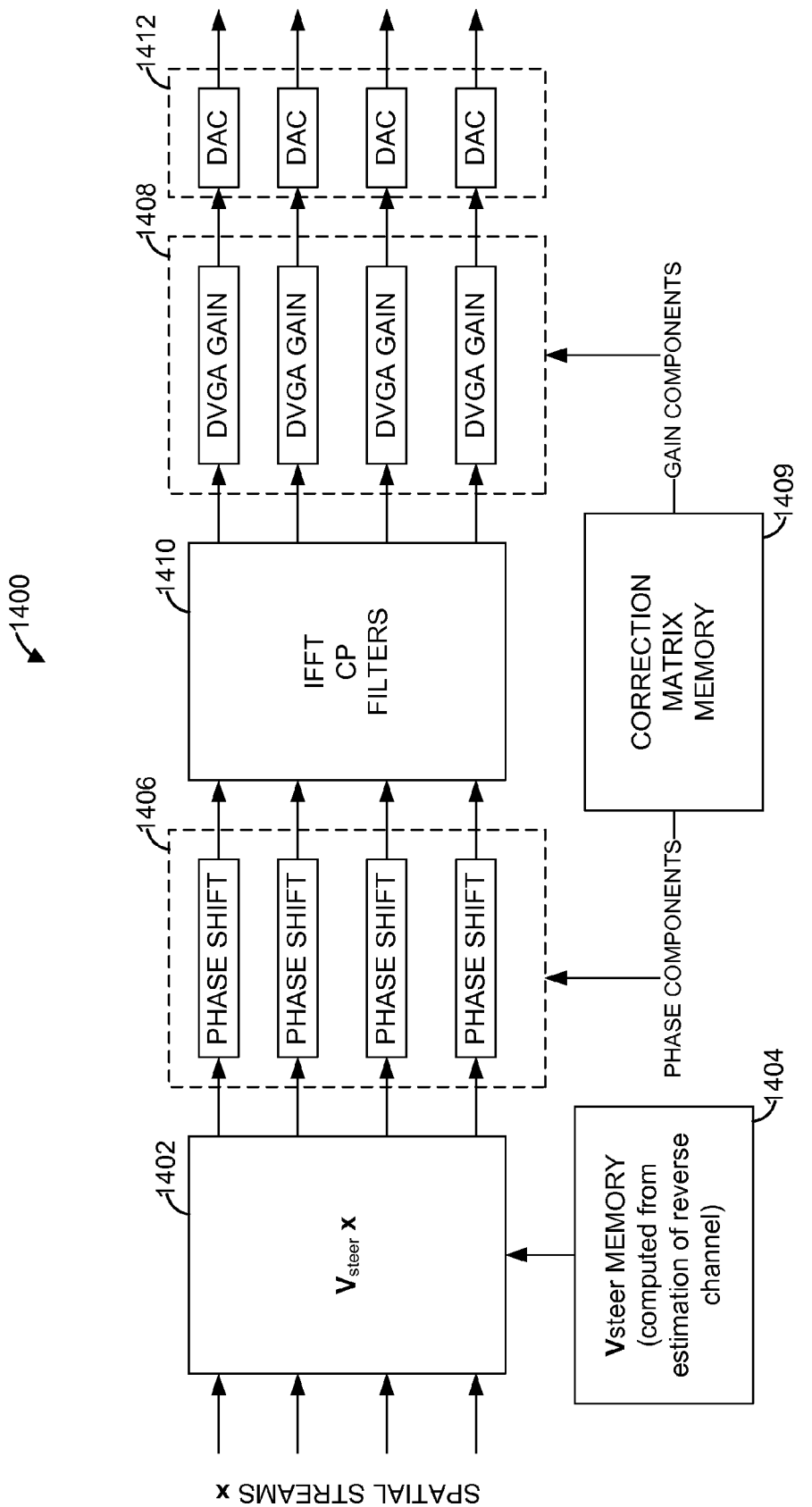
FIG. 19 is a block diagram of an example implementation of a space time mapping controller of the transmitter of FIG. 1 applying the correction matrix from FIGS. 14A, 14B, 16A, and 16B to transmit a signal.

FIG. 19 illustrates an example configuration 1400 of the space-time mapping block 24 of FIG. 1, which apply the determined correction matrix to the forward channel using a frequency domain for performing phase shifting. The spatial streams, x, are provided to a beamsteering matrix controller 1402, which applies the computed steering matrix, $V_{steer}$, computed as discussed above and stored in a memory 1404. When compensating only the phase differences among the antennas on the Station A, the controller 1402 provides parallel output signals to a phase correction stage 1406, which then applies different phase shifts for each output signal, as determined by the stored correction matrix ($K_{A,Tx}$) stored in memory 1409 and as determined by either of the blocks 1118 or 1228 in methods 1100 and 1200, respectively. The correction matrix $K_{A,Tx}$ may use only the phase components unless the correction matrix is only expressed in terms of phase. The stage 1406 may be implemented by different phase shifter stages 1402a-1402d (not individually labeled), one for each transmitter chain (antenna).

In the illustrated example, correction of the phase shift is determined in the frequency domain. At the transmitter side, the correction is performed on each sub-carrier at each transmitter chain, corresponding to each antenna, after the beamsteering matrix, $V_{steer}$, has been applied to the signal stream, x.

In some examples, Station A also compensates for gain mismatches, by using a gain correction stage 1408 implemented, for example, using a digital variable gain amplifier (DVGA). The stage is implemented by different DVGA gain stages 1408a-1408d (not individually labeled), one for each transmit antenna, in the illustrated example. The gain correction stage applies digital gain with correction values, from the correction matrix, $K_{A,Tx}$, to each transmitter chain, where the corresponding matrix multiplication may be done in the time domain. In the illustrated example, an inverse fast Fourier transform (IFFT) controller 1410 converts the phase corrected signal of stage 1406 from the frequency domain to the time domain for the gain correction stage 1408. A corresponding DAC converter stage 1412 provides the corrected signal stream to the corresponding antennas of Station A.

Figure 20:
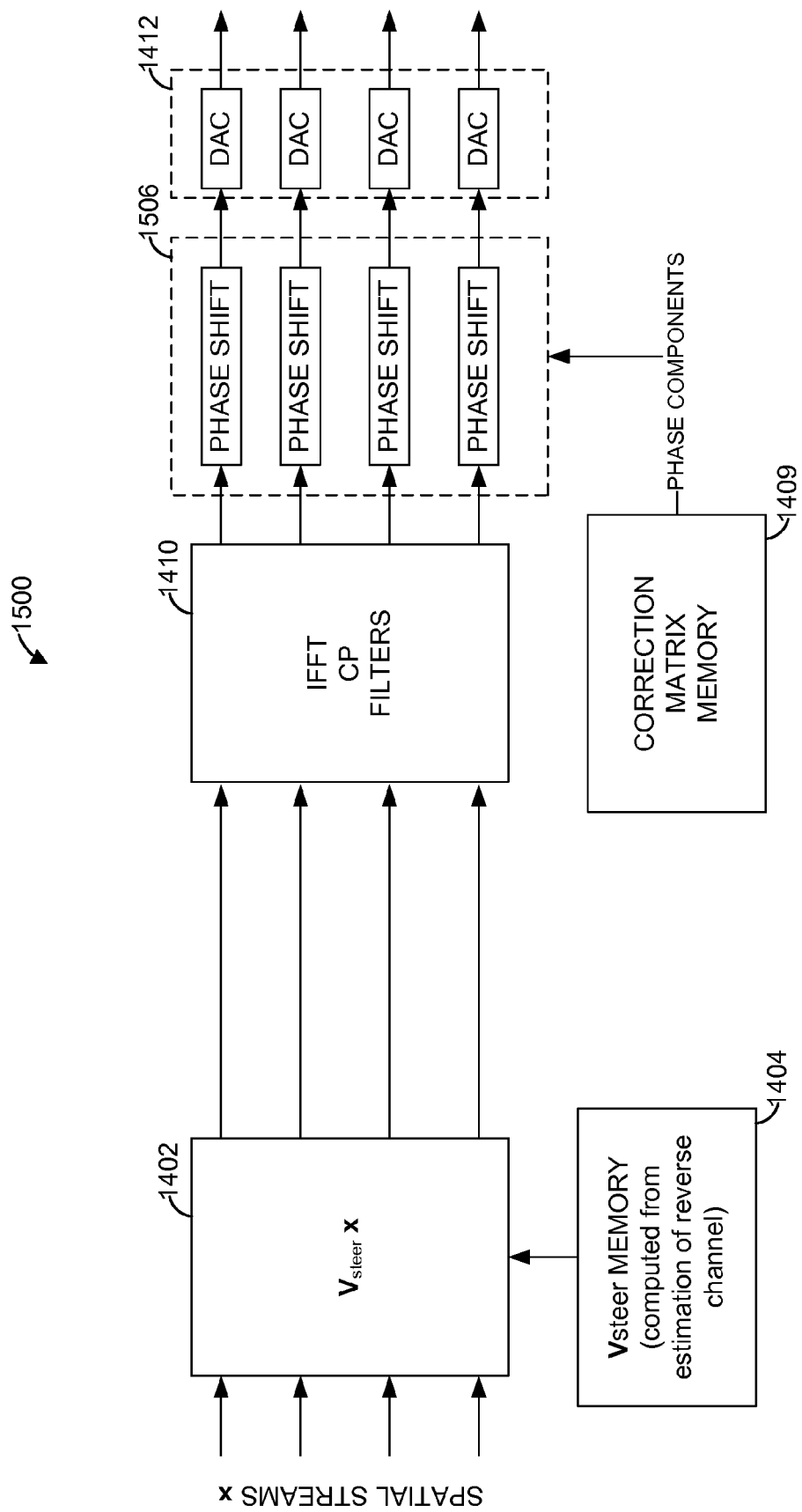
FIG. 20 is a block diagram of another example implementation of a space time mapping controller of the transmitter of FIG. 1 applying the correction matrix from FIGS. 14A, 14B, 16A, and 16B to transmit a signal.

FIG. 20 illustrates an example configuration 1500 of the space-time mapping block 24 of FIG. 1, similar to that of FIG. 19 (and using like reference numbers), but which apply the determined correction matrix to the forward channel using a time domain for performing phase shifting. When compensating only the phase differences among the antennas on the Station A, the controller 1402 provides parallel output signals to the IFFT controller 1410, which converts the phase corrected signal of stage 1406 from the frequency domain to the time domain. The phase correction stage 1506 applies different phase shifts for each output signal, as determined by the stored correction matrix ($K_{A,Tx}$) stored in memory 1409 and as determined by either of the blocks 1118 or 1228 in methods 1100 and 1200, respectively. A gain correction stage is not shown, but may be implemented as in FIG. 19, in some examples.

Figure 21:
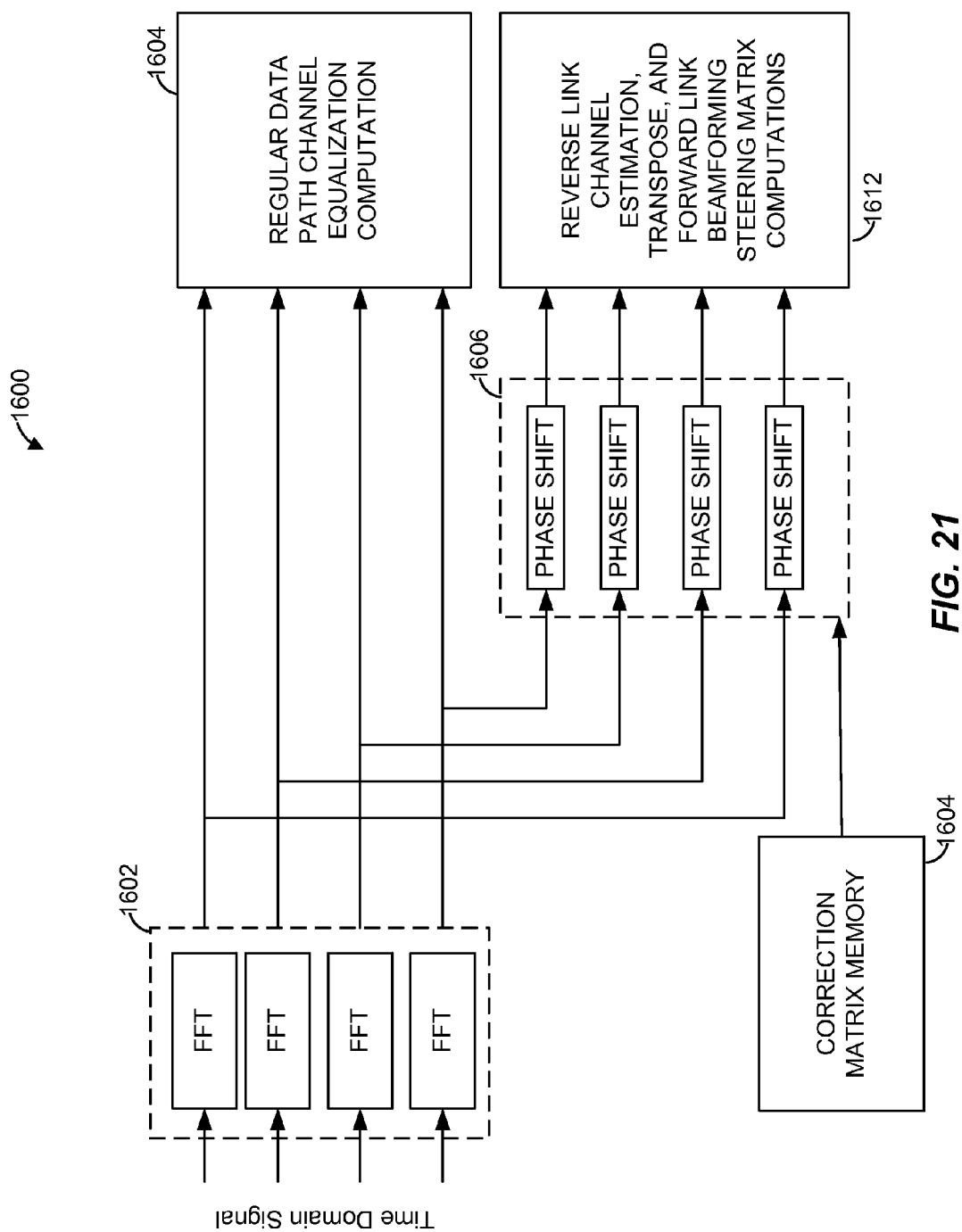
FIG. 21 is a block diagram of an example implementation of a space time mapping controller of the transceiver of FIG. 1 applying the correction matrix from FIGS. 14A, 14B, 16A, and 16B to receive a signal.

FIG. 21 illustrates an example configuration 1600 of the space-time mapping block 24 of FIG. 1, which applies a correction matrix to signals received on the reverse channel using a frequency domain for performing phase shifting. The received time domain signals are provided to a FFT controller 1602, which converts the time domain signals to the frequency domain. The FFT controller 1602 may be implemented as individual FFT stages 1602a-1602d (not labeled), and where the output from the FFT controller 1602 is provided to a data path channel equalization computation stage 1604. To compensate phase differences among the antennas on the Station A, the controller 1602 provides parallel output signals to a phase correction stage 1606, which then applies different phase shifts for each output signal, as determined by a correction matrix ($K_{A,Rx}$) stored in correction matrix memory 1604. The correction matrix may be determined by either of the blocks 1122 or 1232 in methods 1100 and 1200, respectively. The correction matrix $K_{A,Rx}$ may use only the phase components unless the correction matrix is only expressed in terms of phase. The stage 1606 may be implemented by different phase shifter stages 1606a-1606d (not individually labeled), one for each transmitter chain (antenna).

The output from the stage 1606 is provided to a controller 1612 for reverse link channel estimation, transposing of the reverse link channel estimation, and forward link beamforming steering matrix computations, as may be performed by blocks 1116 of method 1100 or blocks 1222 of method 1200.

In some examples, Station A (e.g., the transmitter 12) also compensates for gain mismatches, by using a gain correction stage (not shown), for example, using a digital variable gain amplifier (DVGA). The gain correction stage may apply digital gain with correction values, from the correction matrix, $K_{A,Rx}$, to each chain, where the corresponding matrix multiplication may be done in the time domain, for example.

Figure 22:
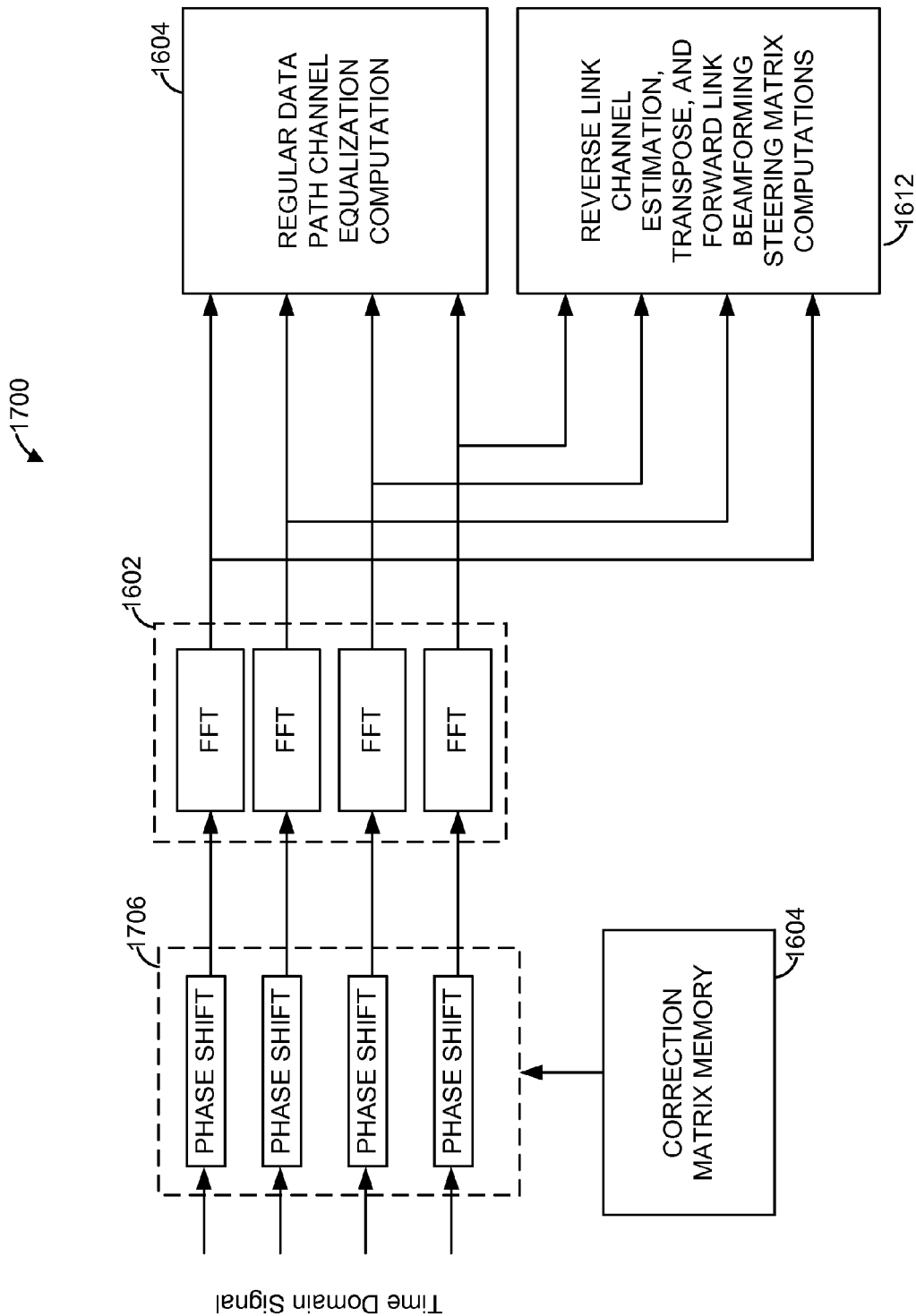
FIG. 22 is a block diagram of another example implementation of a space time mapping controller of the transceiver of FIG. 1 applying the correction matrix from FIGS. 14A, 14B, 16A, and 16B to receive a signal.

FIG. 22 illustrates an example configuration 1700 of the space-time mapping block 24 of FIG. 1, similar to that of FIG. 21 (and using like reference numbers), but applying the determined correction matrix to the reverse channel using a time domain for performing phase shifting. A phase correction stage 1706 applies different phase shifts for each time domain signal, as determined by the stored correction matrix ($K_{A,Rx}$) stored in memory 1604 and as determined by either of the blocks 1118 or 1228 in methods 1100 and 1200, respectively. A gain correction stage is not shown, but may be implemented, in some examples. The phase compensation is therefore applied in the time domain on each received packet signal.

The phase shifted time domain signals are provided to the FFT controller 1602, which converts the time domain signals to the frequency domain, and provides the output signals to the data path channel equalization computation stage 1604 and the controller 1612 where reverse link channel estimation, transposing of the reverse link channel estimation, and forward link beamforming steering matrix computations, as may be performed by blocks 1116 of method 1100 or blocks 1222 of method 1200. Further as, with the example of FIG. 21, the transmitter 12 may also compensate for gain mismatches, by using a gain correction stage (not shown), for example, using a digital variable gain amplifier (DVGA).

While FIGS. 19-21 are described in reference to implementation on the transmitter 12, it will be appreciated that the same configurations may be implemented on the transmitter 16.

While the beamforming and correction matrix calculations described herein are described in one example as being implemented in hardware, these calculations alternatively or additionally be implemented in software stored in, for example, one of the memories 21, 41 and implemented on a processor associated with one or both of the controllers 20, 40, the steering matrix calculation units 28, 48 and/or the units 29 and 39 of the MIMO communication system 10 of FIG. 1, or implanted in firmware as desired. If implemented in software, the routines may be stored in any computer readable memory such as in RAM, ROM, flash memory, a magnetic disk, a laser disk, or other storage medium. Likewise, this software may be delivered to a MIMO system device (such as a transmitter or a receiver) via any known or desired delivery method including, for example, over a communication channel such as a telephone line, the Internet, a wireless connection, etc., or via a transportable medium, such as a computer-readable disk, flash drive, etc.

More generally, the various blocks, operations, and techniques described above may be implemented in hardware, firmware, software, or any combination of hardware, firmware, and/or software. When implemented in hardware, some or all of the blocks, operations, techniques, etc. may be implemented in, for example, a custom integrated circuit (IC), an application specific integrated circuit (ASIC), a field programmable logic array (FPGA), a programmable logic array (PLA), etc.

When implemented in software, the software may be stored in any computer readable memory such as on a magnetic disk, an optical disk, or other storage medium, in a RAM or ROM or flash memory of a computer, processor, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, a wireless communication channel, the Internet, etc. (which are viewed as being the same as or interchangeable with providing such software via a transportable storage medium).

The present invention may be embodied in any type of wireless communication system including, for example, ones used in wireless computer systems such as those implemented via a local area network or a wide area network, internet, cable and satellite based communication systems (such as internet, data, video and voice communication systems), wireless telephone systems (including cellular phone systems, voice over internet protocol (VoIP) systems, home-based wireless telephone systems, etc.)

Moreover, while the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method of beamforming within a communication system having (i) a first transceiver device having a first plurality of antennas and (ii) a second transceiver device having a second plurality of antennas, the method comprising:

transmitting, from the first transceiver device to the second transceiver device, via a forward channel a first calibration signal requesting a non-sounding packet from the second transceiver device, where the non-sounding packet from the second transceiver device is to include a description of the forward channel;

receiving, at the first transceiver device, via a reverse channel the non-sounding packet from the second transceiver device;

receiving, at the first transceiver device from the second transceiver device, via the reverse channel a second calibration signal requesting a non-sounding packet from the first transceiver device, where the non-sounding packet from the first transceiver device is to include a description of the reverse channel;

determining, at the first transceiver device, (i) a partial dimensional description of the reverse channel based on receipt of the non-sounding packet from the second transceiver device or (ii) a full dimensional description of the reverse channel based on receipt of the second calibration signal requesting the non-sounding packet from the first transceiver device; and determining, at the first transceiver device, a first device correction matrix from the received non-sounding packet from the second transceiver device and (i) the partial dimensional description of the reverse channel or (ii) full dimensional description of the reverse channel, wherein the first transceiver is to use the correction matrix to process signals to be transmitted via the forward channel, where the first device correction matrix is for use in transmitting data via the forward channel.

2. A method of claim 1, further comprising transmitting (i) the partial dimensional description of the reverse channel based on receipt of the non-sounding packet from the second transceiver device or (ii) the full dimensional description of the reverse channel based on receipt of the second calibration signal requesting the non-sounding packet from the first transceiver device, to the second transceiver device.

3. A method of claim 2, further comprising determining, at the second transceiver device, a second device correction matrix from the non-sounding packet from the second transceiver device and from the non-sounding packet from the first transceiver device which includes either (i) the partial dimensional description of the reverse channel or (ii) full dimensional description of the reverse channel, transmitted from the first transceiver device.

4. A method of claim 1, wherein the wherein the non-sounding packet from the second transceiver device includes a full dimensional description of the forward channel.

5. A method of claim 4, wherein the description of the forward channel in the non-sounding packet from the second transceiver device is an estimate of the forward channel.

6. A method of claim 4, wherein the description of the forward channel in the non-sounding packet from the second transceiver device is a steering matrix for communicating on the forward channel.

7. A method of claim 1, wherein the non-sounding packet from the first transceiver device includes a full dimensional description of the reverse channel.

8. A method of claim 7, wherein the full dimensional description of the reverse channel in the non-sounding packet from the first transceiver device is an estimate of the reverse channel.

9. A method of claim 7, wherein the full dimensional description of the reverse channel in the non-sounding packet from the first transceiver device is a steering matrix for communicating on the reverse channel.

10. A method of claim 1, wherein the first calibration signal includes a request for both the non-sounding packet from the second transceiver device and a sounding packet from the second transceiver device.

11. A method of claim 1, wherein determining the first device correction matrix comprises:
determining, at the first transceiver device, phase difference information regarding phase differences between
(i) the description of the forward channel, and
(ii) (a) the partial dimensional description of the reverse channel or (b) the full dimensional description of the reverse channel; and
determining the first device correction matrix based on the phase difference information.

12. A method according to claim 1, wherein determining the first device correction matrix comprises normalizing a diagonal of the first device correction matrix such that the first device correction matrix corresponds to phase shifts.

13. A method according to claim 1, further comprising:
applying, in a frequency domain, the first device correction matrix to a signal to be transmitted via the forward channel.

14. A method according to claim 1, further comprising:
applying, in a time domain, the first device correction matrix to a signal to be transmitted via the forward channel.

15. A method according to claim 1, further comprising, the first transceiver device, determining an additional correction matrix based on the first transceiver correction matrix, where the additional correction matrix is for use in processing data received via the reverse channel.

16. A method according to claim 15, further comprising:
applying, in a frequency domain, the additional correction matrix to a signal received via the reverse channel.

17. A method according to claim 15, further comprising:
applying, in a time domain, the additional correction matrix to a signal received via the reverse channel.

18. A method according to claim 1, further comprising:
transmitting, by the first transceiver device, a first signal that includes an identification of the first transceiver device as an implicit beamformer device and that includes a request for identification from the second transceiver device; and
receiving, from the second transceiver device, a second signal that identifies the second transceiver device as an implicit beamformer device.

19. An apparatus, comprising:
a first transceiver device having one or more integrated circuit devices configured to
transmit a first calibration signal to a second transceiver device via a forward channel, the first calibration signal requesting a non-sounding packet from the second transceiver device, where the non-sounding packet from the second transceiver device is to include a description of the forward channel,
receive the non-sounding packet from the second transceiver device via a reverse channel,
receive a second calibration signal from the second transceiver device via the reverse channel, the second calibration signal requesting a non-sounding packet from the first transceiver device, where the non-sounding packet from the first transceiver device is to include a description of the reverse channel,
determine (i) a partial dimensional description of the reverse channel based on receipt of the non-sounding packet from the second transceiver device or (ii) a full dimensional description of the reverse channel based on receipt of the second calibration signal requesting the non-sounding packet from the first transceiver device,
determine a first device correction matrix from the received non-sounding packet from the second transceiver device and (i) the partial dimensional description of the reverse channel or (ii) full dimensional description of the reverse channel, and
use the first device correction matrix to process signals transmitted via the forward channel.

20. The apparatus of claim 19, wherein the wherein the non-sounding packet from the second transceiver device includes a full dimensional description of the forward channel.

21. The apparatus of claim 20, wherein the description of the forward channel in the non-sounding packet from the second transceiver device is a steering matrix for communicating on the forward channel.

22. The apparatus of claim 19, wherein the non-sounding packet from the first transceiver device includes a full dimensional description of the reverse channel.

23. The apparatus of claim 22, wherein the full dimensional description of the reverse channel in the non-sounding packet from the first transceiver device is a steering matrix for communicating on the reverse channel.

24. The apparatus of claim 19, wherein the first calibration signal includes a request for both the non-sounding packet from the second transceiver device and a sounding packet from the second transceiver device.

25. The apparatus of claim 19, wherein determining the first device correction matrix comprises:
   determining, at the first transceiver device, phase difference information regarding phase differences between
      (i) the description of the forward channel, and
      (ii) (a) the partial dimensional description of the reverse channel or (b) the full dimensional description of the reverse channel; and
   determining the first device correction matrix based on the phase difference information.

\* \* \* \* \*